United States Patent [19]

Landa et al.

[11] Patent Number: 4,629,310

[45] Date of Patent: Dec. 16, 1986

[54] OPTICAL SCANNING SYSTEM FOR VARIABLE-MAGNIFICATION COPIER

[75] Inventors: Benzion Landa, Edmonton, Canada; Oded Sagiv, Ramat-Gan; Aron Shmaiser, Rishon-Le-zion, both of Israel; Richard J. Bernhauer, Binghamton; Peter Feher, Johnson City, both of N.Y.

[73] Assignee: Savin Corporation, Stamford, Conn.

[21] Appl. No.: 628,239

[22] Filed: Jul. 6, 1984

[51] Int. Cl.$^4$ .............................................. G03G 15/04
[52] U.S. Cl. .............................................. 355/8; 355/57
[58] Field of Search ................... 355/8, 49, 51, 57, 60, 355/66, 16; 358/285; 474/148; 310/74, 76, 78; 318/161

[56] References Cited

U.S. PATENT DOCUMENTS

| | | | |
|---|---|---|---|
| 2,405,017 | 7/1946 | Crooke | 318/161 X |
| 3,632,203 | 1/1972 | Kolibas | 355/8 |
| 3,743,274 | 7/1973 | Komori | 355/8 X |
| 3,998,540 | 12/1976 | Weinstein | 355/8 |
| 4,047,444 | 9/1977 | Jeffrey | 474/148 |
| 4,332,461 | 6/1982 | Cail et al. | 355/14 R |
| 4,355,883 | 10/1982 | Landa | 355/8 |
| 4,427,909 | 1/1984 | Takahashi | 355/8 |
| 4,435,077 | 3/1984 | Suzuki et al. | 355/14 C X |
| 4,448,514 | 5/1984 | Fujii et al. | 355/11 X |
| 4,500,197 | 2/1985 | Dannatt | 355/8 |

FOREIGN PATENT DOCUMENTS

| | | | |
|---|---|---|---|
| 3038494 | 5/1982 | Fed. Rep. of Germany | 355/8 |
| 59-58426 | 4/1984 | Japan | 355/8 |

*Primary Examiner*—Arthur T. Grimley
*Assistant Examiner*—J. Pondegrass
*Attorney, Agent, or Firm*—Shenier & O'Connor

[57] ABSTRACT

An optical scanning system for a variable-magnification electrophotographic copier includes a first scanning carriage reciprocated along a path by endless bands attached to the carriage at transversely spaced locations and driven purely by friction. Pulleys mounted on a second scanning carriage at transversely spaced locations roll between the drive bands and stationary guides to move the second carriage at half the speed of the first carriage. The second carriage may be shifted relative to the first carriage by moving it to a location at which arms lift the pulleys from the guides. A flywheel rotating at the desired scanning speed is coupled to the scanner drive train after the drive train has been smoothly accelerated to the desired scanning speed, and is uncoupled from the scanner drive train before the drive train is decelerated at the end of the scanning stroke. Misalignments between the separately driven ends of the first carriage are corrected by intercepting the carriage ends to induce differential slippage in the portions of the drive train coupled to the respective carriage ends. Similar misalignments between the separately driven ends of the second carriage are corrected by commonly rotating gears at the respective carriage ends that mesh with fixed teeth at one end of the scanning path. Misalignments between the first and second carriages are corrected by a gear, carried by one of the pulleys of the second carriage, which meshes with a normally immobilized gear as the second carriage moves past the same location.

36 Claims, 21 Drawing Figures

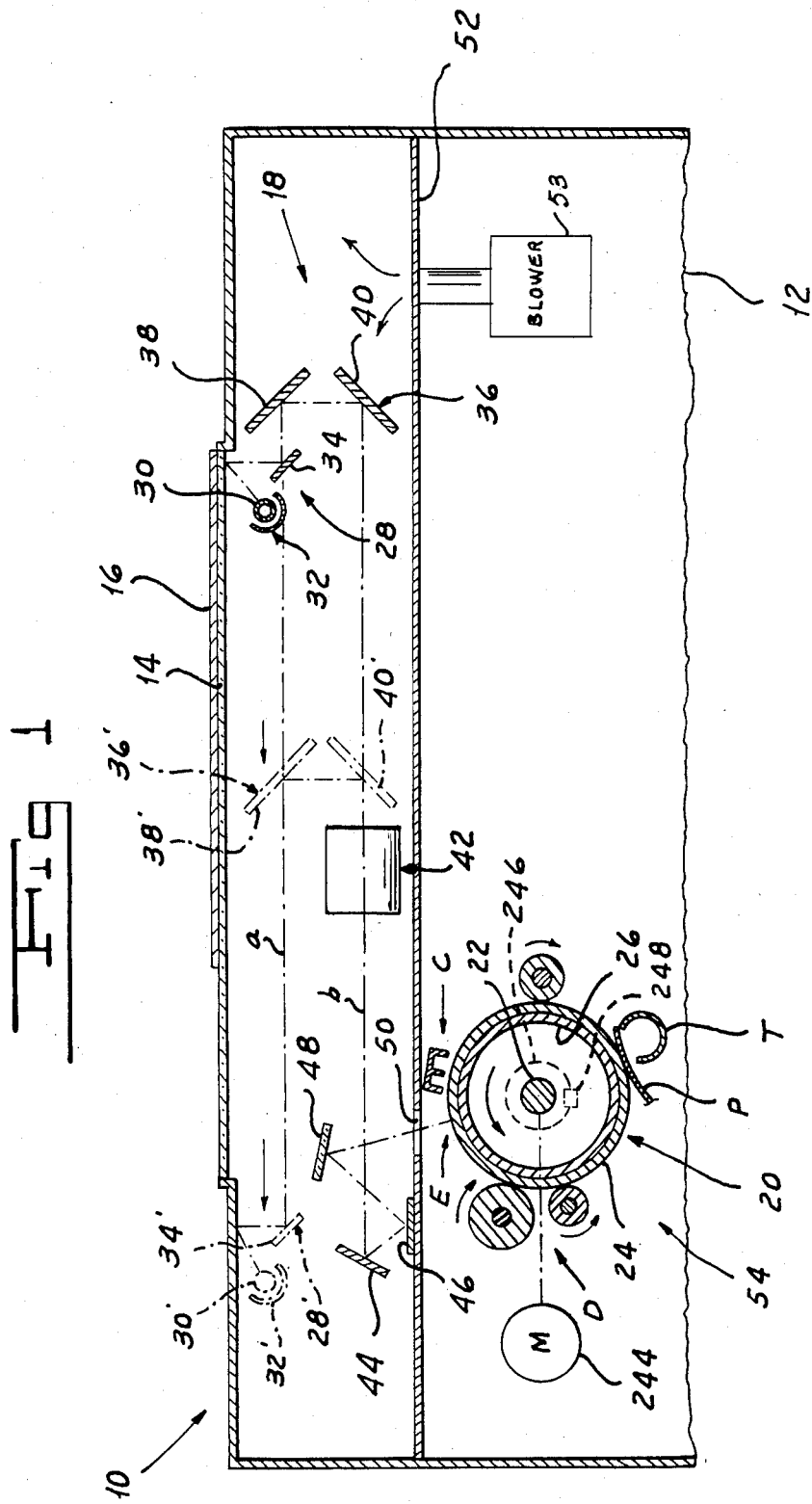

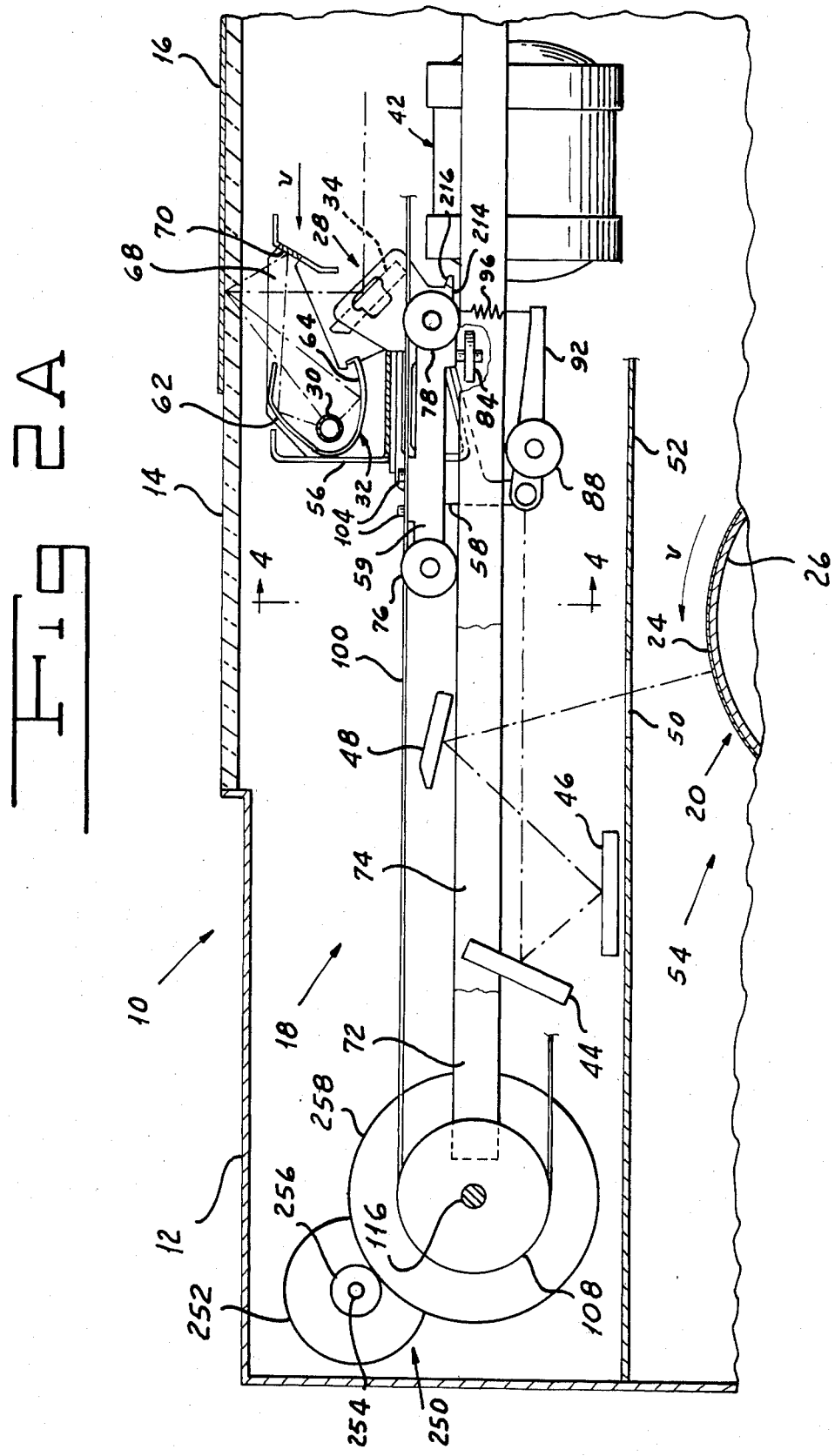

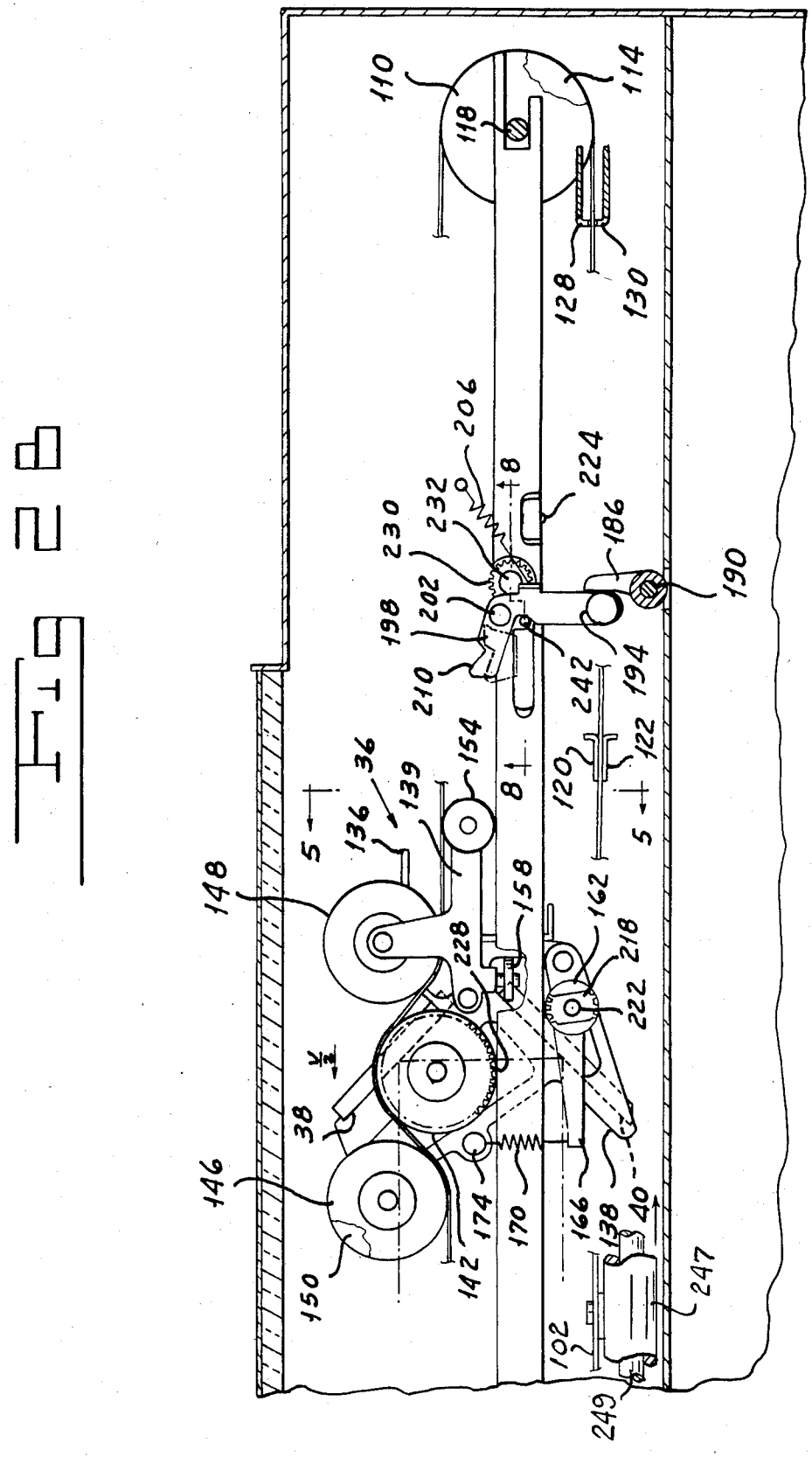

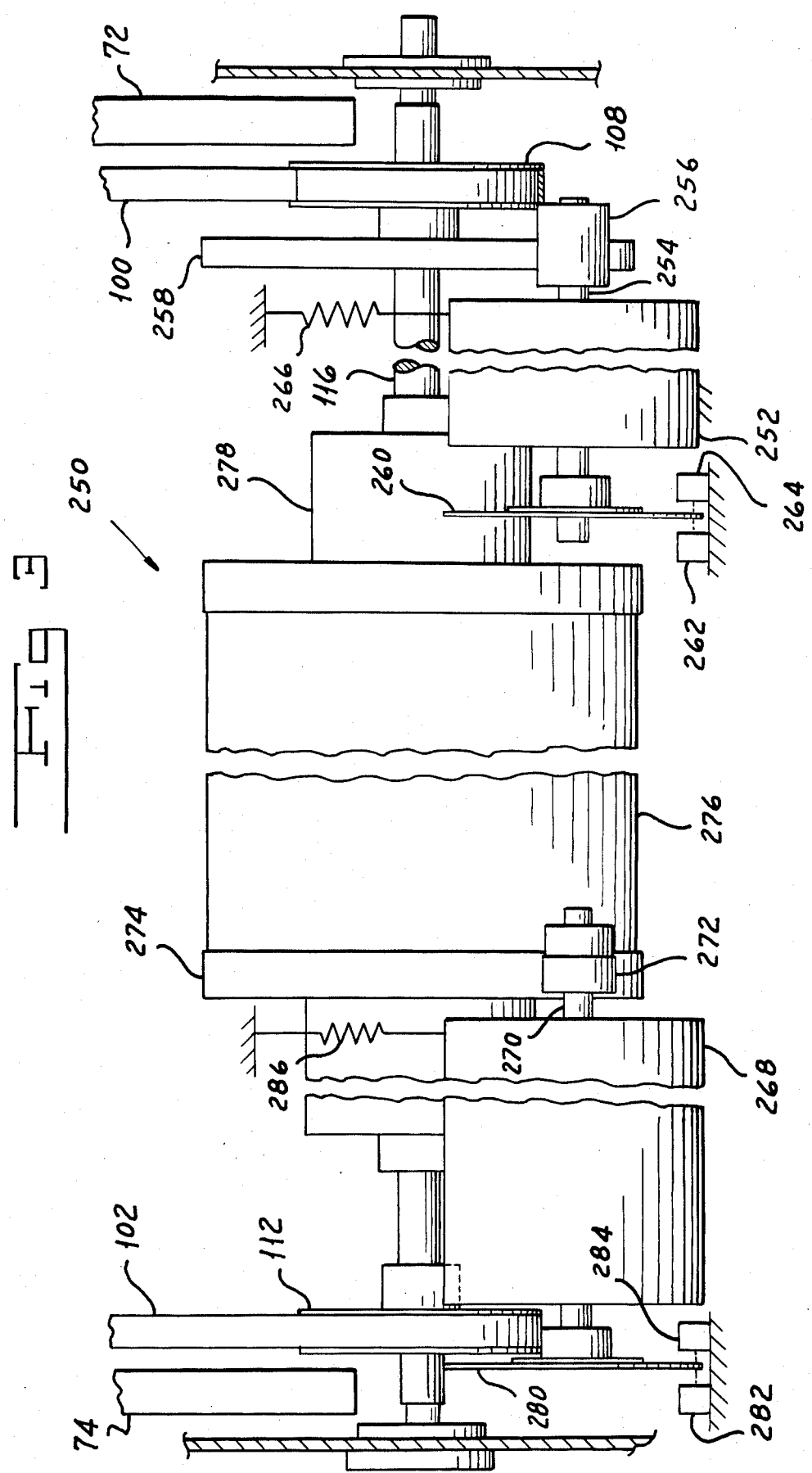

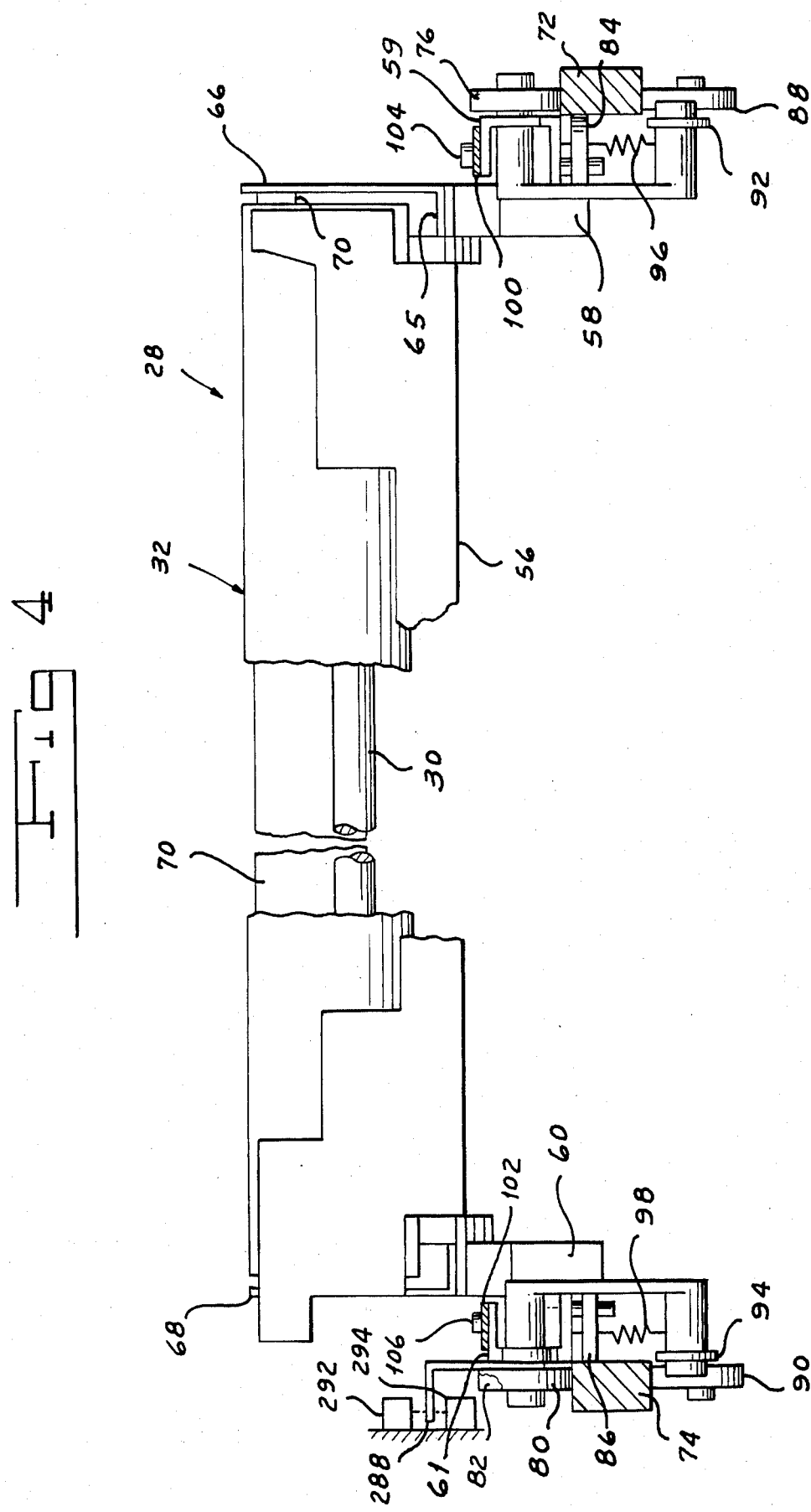

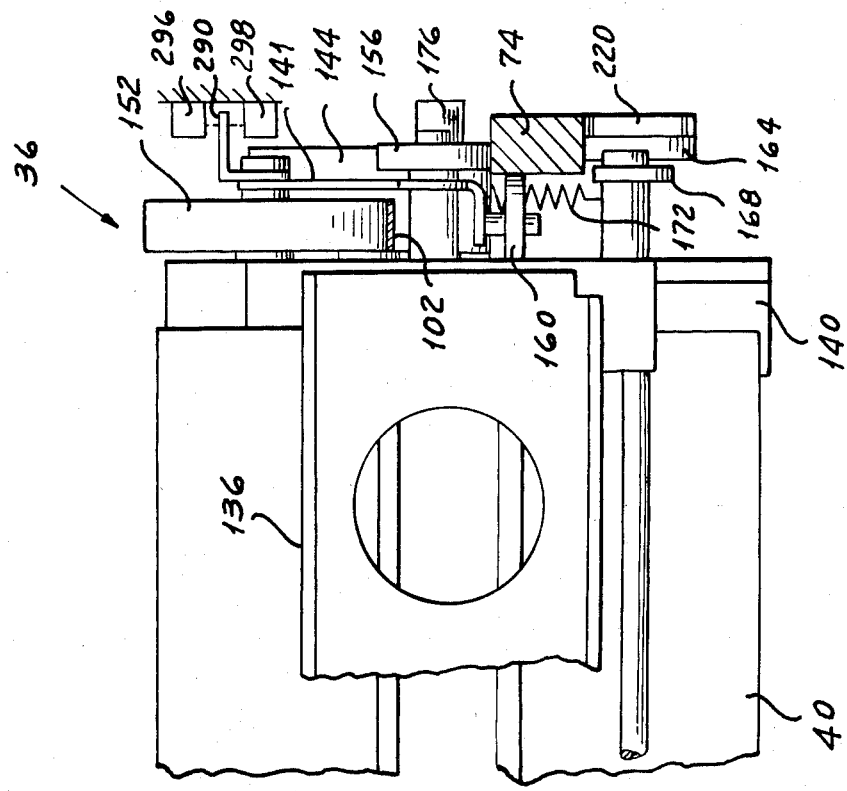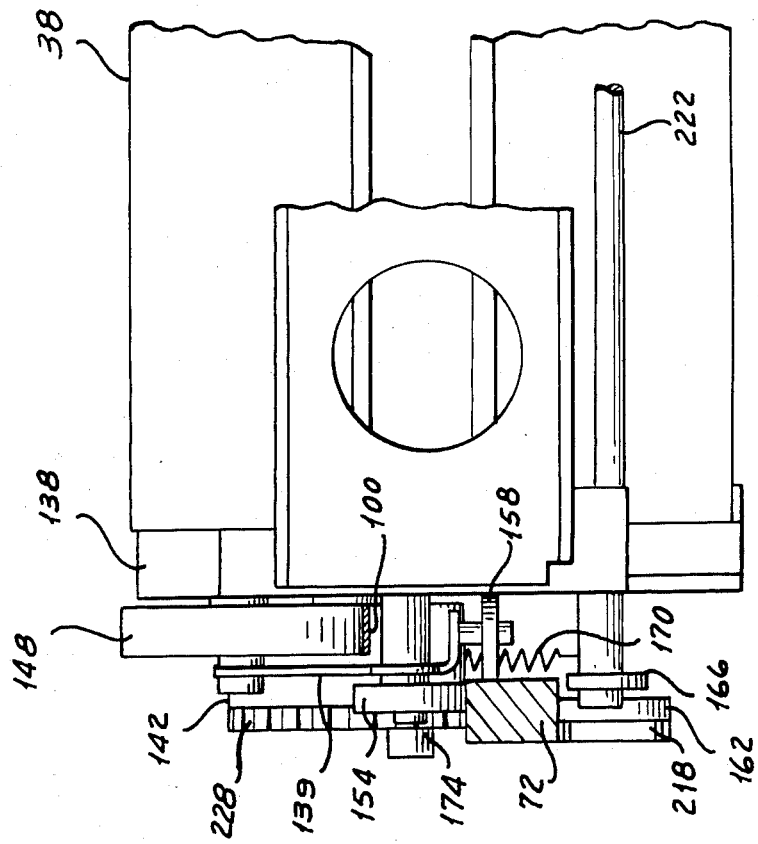
Fig 5

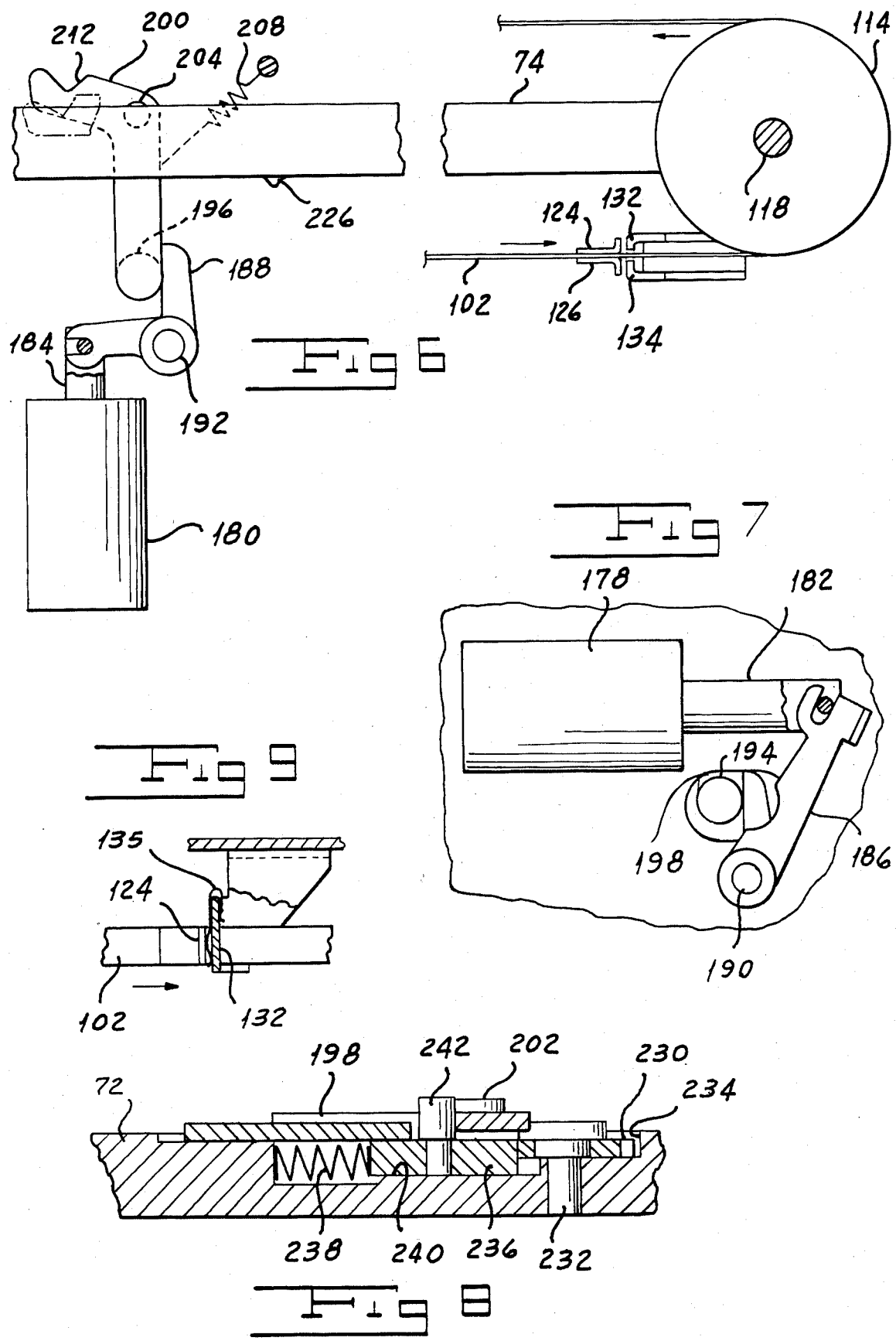

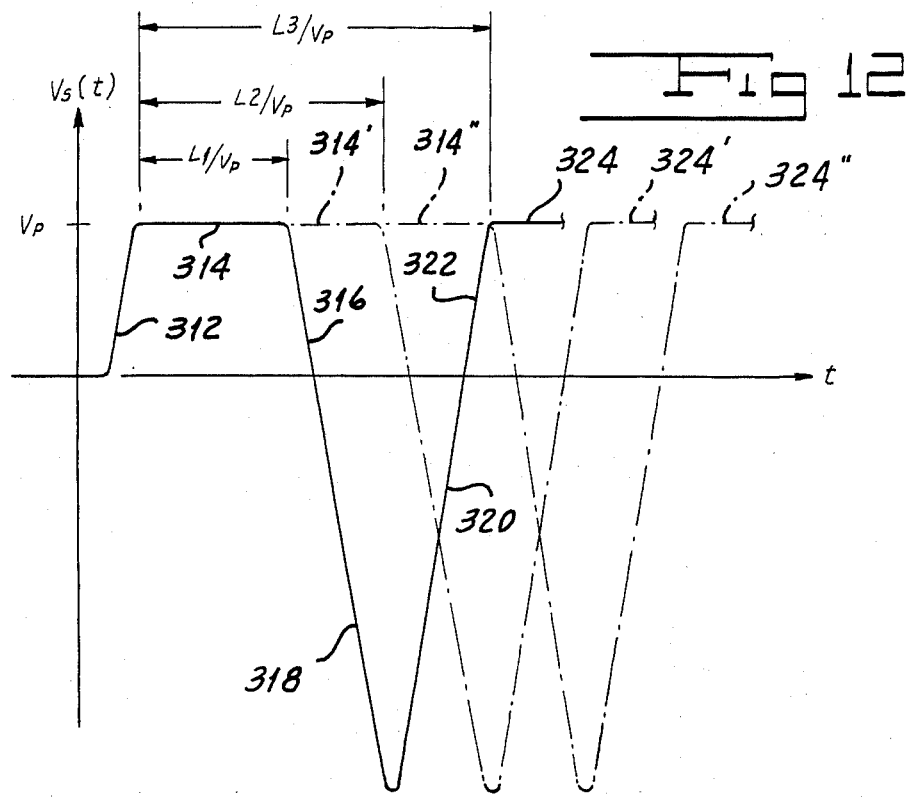
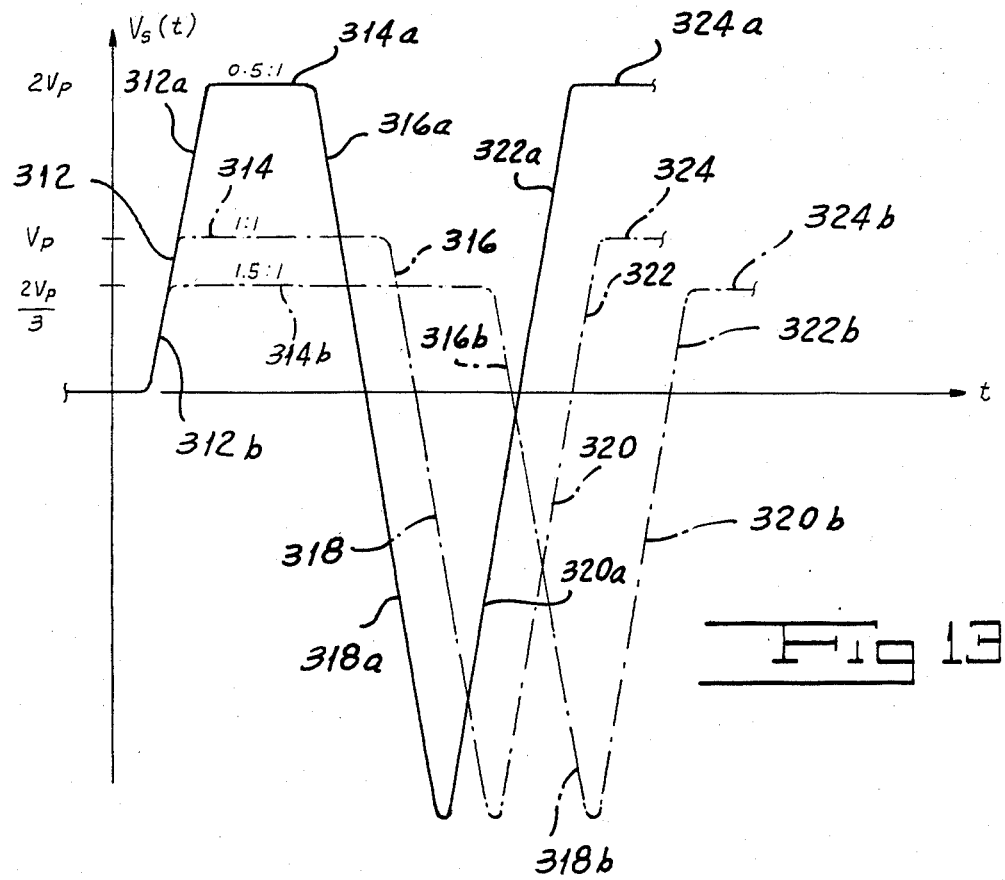

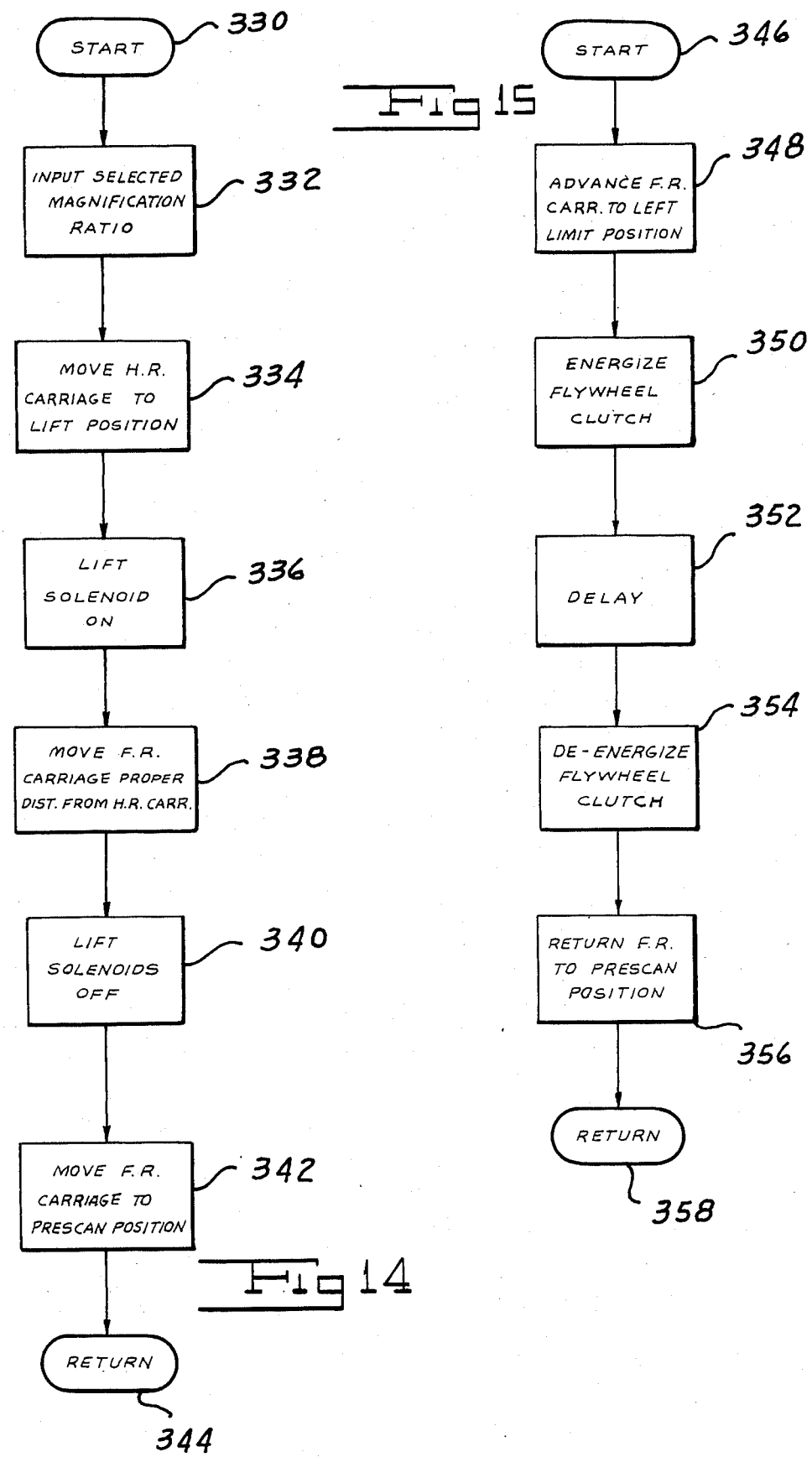

OPTICAL SCANNING SYSTEM FOR VARIABLE-MAGNIFICATION COPIER

FIELD OF THE INVENTION

Our invention relates to an optical system for scanning original documents and, more particularly, to such a scanning system for use in a copier capable of continuously variable magnification.

BACKGROUND OF THE INVENTION

In the prior art, scanning systems for electrophotographic copiers usually include a full-rate carriage and a half-rate carriage. The full-rate carriage, which supports a lamp and a mirror, moves along such a path as to illuminate successive portions of the document. The half-rate carriage supports one or more mirrors. It moves in the same direction as the full-rate carriage, but at one-half its speed. Light from the document is reflected by the full-rate mirror to the half-rate mirror and thence to a lens. The lens focuses the light upon a revolving photoconductive drum, producing a latent image from which a photocopy is made. The motion of the half-rate carriage relative to the full-rate carriage maintains a constant object distance from the illuminated portion of the document to the lens so that the image on the photoconductive drum is always in focus.

Scanning systems of the type described above must meet several requirements. During the scanning phase of the cycle, in which an image of the illuminated portion of the document is being projected onto the photoconductor, the motion of the scanning elements must be as nearly uniform as possible. Any jitter of the scanning elements during this phase of operation results in an undesirable light modulation, or banding, of the resulting copy, especially when copying low-contrast originals. A scanning system must also accelerate the scanning elements rapidly to a proper velocity during the start-up phase of the scanning cycle, as well as decelerate the scanning elements at the end of the forward scanning stroke. Likewise, the scanning should have a relatively short retrace time to achieve a high copy rate. Accelerations should not be so great, however, as to cause jitter or to damage the exposure lamp. Finally, the various scanning elements must be moved in close synchronism with one another as well as with the photoconductor.

To some extent, the various requirements discussed hereinabove conflict. Thus, generally in the prior art, gears, timing belts, chains, sprockets, and the like have been used to couple moving scanning elements to a drive mechanism. While such positive coupling elements allow relatively high-speed operation and insure synchronism between various elements so coupled, they also produce a cogging effect, impairing the smoothness of movement that is required during the scanning phase of the cycle. Furthermore, if massive scanning elements are used to smooth out momentary speed fluctuations, such elements limit the maximum acceleration or deceleration, undesirably reducing the copying rate.

It is known in the art to couple scanning carriages to the photoconductor drum during the forward scanning stroke for synchronous movement with the drum and to uncouple the carriages from the drum at the end of the forward stroke to permit a spring to return the scanning carriages to their original positions. Although such a scanning system has a lower inertia during the return stroke than during the forward scanning stroke, it does not completely solve the problems referred to above. In such a system, the mass of the continuously rotating photoconductor drum is used to accelerate the scanning elements almost instantaneously from the rest position at the beginning of each scanning cycle. Such an instantaneous acceleration gives rise to large reaction forces and vibrations in the drive train, which impair the smoothness of scanning motion. Further, such an arrangement is unsuitable, without modification, for use in a variable-magnification copier, since the scanning elements must be moved at variable speeds, possibly over a continuous range, relative to the speed of the photoconductor.

Cail et al U.S. Pat. No. 4,332,461 discloses a scanner drive for a variable-magnification copier in which a separate scanner motor is smoothly accelerated at the beginning of the scanning cycle to the desired scanning speed at a controlled rate of acceleration, and is phase-locked to the photoconductor motor, at a velocity ratio determined by the selected magnification, during the constant-velocity portion of the scanning cycle. Although the disclosed system is said to be capable of substantially continuously variable magnification and to eliminate direct mechanical couplings between the photoconductor drive and the scanner drive, it does not completely solve the problems of the prior art. In particular, the servo system disclosed, while locking the scanning velocity to the photoconductor velocity, cannot be relied upon to eliminate momentary fluctuations in scanning velocity. Moving scanning elements massive enough to provide the required inertial smoothing would also undesirably reduce the scanning rate achievable with a given motor torque.

Scanning carriages are usually mounted on two parallel guides and are driven by a single cable, attached to the full-rate carriage and engaging a pulley mounted on the half-rate carriage. The cable and the pulley are mounted on one side of the carriages, adjacent one of the guides, to avoid obstructing the light path from document to lens. Since the cable and pulley do not act through the centers of gravity of the carriages, appreciable moments are applied to the carriages, tending to cock them. To resist cocking, each carriage is provided with guide bearings having a large spacing along at least one of the guides, increasing the length and weight of the carriages. The carriages must have a rigid and hence massive structure to resist distortion under the asymmetrical driving forces. Acceleration of the carriages at the beginning and end of a scan produces large frictional forces in the guide bearings which tend to cause chattering.

It is also known in the art to use separate, transversely spaced cable drives, coupled to the scanner carriages along their respective sides. Although such an arrangement eliminates the rotational reaction forces developed by the scanner carriages upon acceleration, it introduces the possibility that a misalignment of the drive cables will produce a corresponding shearing of the scanner carriages.

SUMMARY OF THE INVENTION

In accordance with one aspect of our invention, the full-rate carriage of an optical scanning system is reciprocated along the scanning path by endless smooth bands or cables that are attached to the carriage at transversely spaced locations, on opposite sides of the scanning path. These cables are driven solely by friction from pulleys at one end of the scanning path. Misalignments between the separately driven ends of the full-rate carriage resulting from slippage are periodically corrected by driving the carriage against fixed stops to induce differential slippage in the portions of the drive train coupled to the respective carriage ends. Alternatively, the smooth bands and pulleys may be formed, at isolated portions along their mutually contacting surfaces, with mating projections and recesses that naturally tend to self-align so as to eliminate any small misalignment due to slippage.

In accordance with another aspect of our invention, the half-rate carriage is frictionally driven at the required speed by pulleys, mounted on the carriage at transversely spaced locations. These pulleys roll between the same bands as those used to drive the full-rate carriage and stationary guide rails. The half-rate carriage is uncoupled from the drive bands whenever it is desired to shift its position relative to that of the full-rate carriage, as for operation at a different magnification, by moving the half-rate carriage to a location at which lifting arms are actuated to lift the carriage, and hence the pulleys from the guide rails. Misalignments between the separately driven ends of the half-rate carriage are corrected by commonly rotating gears at the respective carriage ends. These gears mesh with fixed teeth as the carriage moves past a predetermined location at one end of the scanning path. Misalignments between the full-rate and half-rate carriages are corrected by a gear, carried by one of the pulleys of the half-rate carriage. This gear meshes with a normally immobilized gear as the half-rate carriage moves past the same location.

By using smooth drive elements, coupled only by friction, we ensure that the motion of the full-rate and half-rate carriages along the scanning path is perfectly uniform, thereby preventing any degradation of the image due to jitter. At the same time, by correcting for any slippage occurring between the carriages and the drive train, we maintain nearly perfect synchronism between the carriages and other parts of the scanning system, even at high speeds of operation. By driving the half-rate carriage through pulleys rolling between the drive bands and fixed guide rails, we allow the half-rate carriage to be shifted relative to the full-rate carriage simply by momentarily uncoupling it from the drive band, without having to shift any ground member as in the prior art.

In accordance with yet another aspect of our invention, a flywheel rotating constantly at the desired scanning speed for the selected magnification is coupled to the scanner drive train after the drive train has been smoothly accelerated to the desired scanning speed. The flywheel is uncoupled from the scanner drive train before the drive train is decelerated at the end of the scanning stroke. The intermittent coupling and uncoupling of the flywheel to the scanner drive train may be accomplished by energizing a clutch at the end of an initial acceleration ramp and by de-energizing the clutch at the end of the scanning phase, before a deceleration ramp. Alternatively, the scanner drive train may be driven at a target velocity slightly in excess of the desired scanning velocity, and coupling of the flywheel to the drive train may be accomplished automatically by means of a one-way clutch permitting the flywheel to overrun the scanner drive.

By coupling the flywheel to the scanner drive train during the constant-velocity phase of the scanning cycle, when a document is actually being scanned, we provide the scanning system with a high effective mass precisely when such mass is desirable to reduce speed fluctuations. By uncoupling the flywheel from the drive train at other times, we create a low-mass system when such low mass is desirable to reduce acceleration times, and thus increase the scanning rate. Further, by using a servo loop to synchronize the motion of the flywheel with that of the photoconductor, we are able to provide continuously variable magnification with inertial smoothing, without the need for continuously adjustable mechanical coupling elements.

BRIEF DESCRIPTION OF THE DRAWINGS

In the accompanying drawings, which form part of the instant specification and which are to be read in conjunction therewith, and in which like reference numerals are used to indicate like parts in the various views:

FIG. 1 is a longitudinal section, with parts omitted, of a variable-magnification copier incorporating our scanning system.

FIGS. 2A and 2B are enlarged fragmentary front elevations, with parts shown in section or broken away, of the left and right halves, respectively, of the scanning system of the copier shown in FIG. 1.

FIG. 3 is a further enlarged fragmentary top plan, with parts shown in section or broken away, of the left end of the scanning system of the copier shown in FIG. 1.

FIG. 4 is a fragmentary section, with parts broken away, of the scanning system of the copier shown in FIG. 1, along line 4—4 of FIG. 2A.

FIG. 5 is a fragmentary section, with parts broken away, of the scanning system of the copier shown in FIG. 1, along line 5—5 of FIG. 2B.

FIG. 6 is a further enlarged fragmentary front elevation, with parts shown in section or broken away, of the right rear portion of the scanning system of the copier shown in FIG. 1.

FIG. 7 is a further enlarged fragmentary front elevation, with parts broken away or shown in section, of the right front portion of the scanning system of the copier shown in FIG. 1.

FIG. 8 is a further enlarged fragmentary section, along line 8—8 of FIG. 2B, of the scanner shown in FIG. 1.

FIG. 9 is a further enlarged top plan, with parts broken away or shown in section, of the right rear portion of the scanning system of the copier shown in FIG. 1.

FIG. 12 is a plot of the scanner velocity as a function of time for various scanning lengths in the one-to-one magnification mode cf the copier shown in FIG. 1.

FIG. 13 is a plot of scanner velocity as a function of time for various selected magnification ratios of the copier shown in FIG. 1.

FIG. 14 is a flowchart of the routine followed by the control circuit shown in FIG. 10 to adjust the positions of the scanning elements when starting operation or changing magnifications.

FIG. 15 is a flowchart of the routine followed by the control circuit shown in FIG. 10 to correct misalignments between the ends of the full-rate scanning carriage.

DESCRIPTION OF THE PREFERRED EMBODIMENTS

Figure 10:
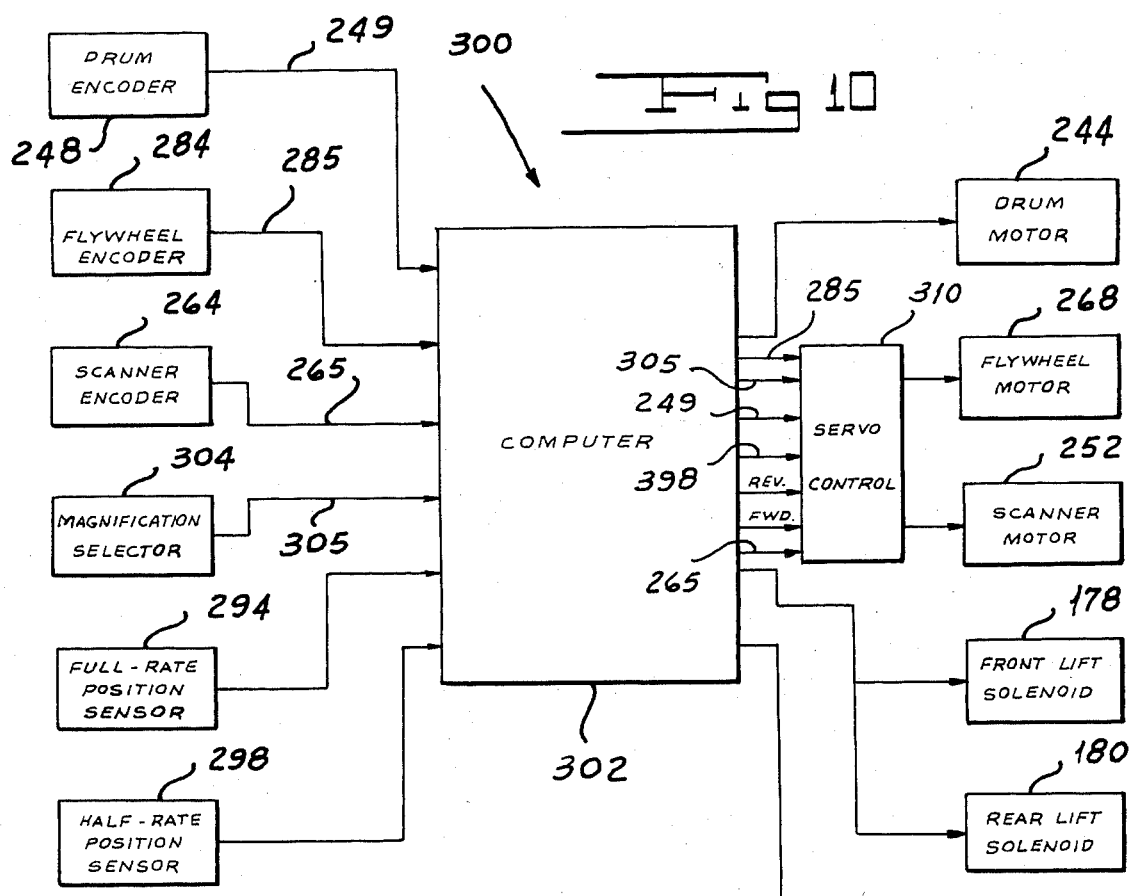
FIG. 10 is a schematic diagram of the control circuit for the scanning system of the copier shown in FIG. 1.

Referring now to FIG. 1, a copier indicated generally by the reference numeral 10 incorporating our scanning system includes a housing 12, the upper wall of which supports a transparent exposure platen 14 for receiving an original document 16. Copier 10 includes an electrophotographic imaging drum, indicated generally by the reference numeral 20, mounted on a shaft 22 for rotation therewith and having a photoconductor 24 supported by a conductive substrate 26. A motor 244 drives the drum 20 at a substantially uniform velocity in a manner to be described.

In a manner well known in the art, the drum photoconductor 24 is rotated first past a charging station C at which the surface of the photoconductor receives a uniform electrostatic charge, then past an exposure station E at which the electrostatically charged surface is exposed to an optical image of the document 16 on the platen 14 to form an electrostatic latent image, then past a developing station D at which a liquid developer containing charged toner particles is applied to the latent-image-bearing surface to form a developed toner image, and finally to a transfer station T at which the developed toner image is transferred from the photoconductor 24 to a carrier sheet P.

The optical scanning system of the copier 10, indicated generally by the reference numeral 18, includes a first, or full-rate, scanning element comprising a carriage indicated generally by the reference numeral 28. Full-rate carriage 28 supports an elongated exposure lamp 30, which directs light onto the document 16 placed on the platen 14, and a mirror 34 arranged to receive light reflected from the illuminated portion of the document 16. An elliptical reflector indicated generally by the reference numeral 32, to be described in further detail below, focuses a narrow beam of light from the lamp 30 onto a transversely extending strip of the document 16.

A second, or half-rate, scanning element comprising a carriage indicated generally by the reference numeral 36 supports an upper mirror 38 and a lower mirror 40. Mirror 34 of the full-rate carriage 28 reflects light from the document 16 to upper mirror 38 of half-rate carriage 36 along a path segment a parallel to the imaging platen 14. Mirror 38 reflects the light downwardly onto lower mirror 40, which reflects the light along the optical axis b of a lens 42 which is parallel to platen 14 and path segment a. A stationary mirror 44 disposed on the other side of lens 42 from mirror 40 reflects the light downwardly onto an upwardly facing stationary mirror 46. Mirror 46 abuts a horizontally extending partition 52 isolating the scanning system 18 from the processing portion 54 of the copier 10 disposed therebelow. A downwardly facing mirror 48 reflects light from mirror 46 through a transversely extending slot 50 in partition 52 onto the portion of the photoconductor 24 passing through the exposure station E. Preferably a blower 53 is used to pressurize the chamber housing the scanning system 18 to inhibit contamination of the optical surfaces.

In the case of a one-to-one magnification ratio, a document 16 placed on the platen 14 is scanned by rotating the drum 20 counterclockwise as viewed in FIG. 1 at a predetermined surface speed; full-rate scanning carriage 28 is simultaneously moved at the same speed from the position shown in solid lines in FIG. 1 to a displaced position such as the position 28' shown in phantom lines in the same figure. Simultaneously with the movement of drum 20 and full-rate carriage 28, half-rate carriage 36 is moved in the same direction as full-rate carriage 28, but at half the speed, between the position shown in solid lines in FIG. 1 and the position 36' shown in phantom lines in the same figure, to maintain a constant optical path length between document 16 and photoconductor 24. At the end of the forward scanning stroke, scanning carriages 28 and 36 are moved in the reverse direction to their original positions in preparation for another scanning cycle.

Referring now to FIGS. 2A and 4, the full-rate scanning carriage 28, which is generally symmetrical about a plane equidistant from its ends, includes respective front and rear end caps 58 and 60, preferably formed of a suitable light-weight material, such as aluminum or plastic, connected by a transversely extending bridge 56 preferably formed of sheet aluminum. Respective front and rear extensions 66 and 68 of a bracket 65 carried by bridge 56 position a transversely extending secondary reflector 70 preferably integrally formed with the extensions 66 and 68. As shown in FIG. 2A, lamp reflector 32 comprises a lower portion 64, shaped to reflect light from lamp 30 directly onto the document 16, and an upper portion 62 shaped to reflect light from lamp 30 onto the same portion of document 16 by way of secondary reflector 70. Reflector 70 directs light from lamp 30 onto the document 16 from the right as viewed in FIG. 2A. Illuminating the document 16 from two sides in this manner eliminates the shadows that might otherwise appear in copies made from, for example, paste-up originals.

Respective front and rear guide rails 72 and 74 having rectangular cross-sections support full-rate scanning carriage 28 for translational movement parallel to exposure platen 14. A bracket 59 secured to front end cap 58 carries a pair of rollers 76 and 78, spaced in the direction of movement of the carriage 28, which roll along the upper surface of front guide rail 72. Front end cap 58 pivotally supports an arm 92 carrying a roller 88 adapted to roll along the lower surface of front guide rail 72. A tension spring 96 coupling the free end of pivot arm 92 to bracket 59 urges roller 88 into engagement with the lower surface of the guide rail 72 to prevent vertical jitter of the carriage 28 and resultant image distortion. Bracket 59 also carries a roller 84, mounted for rotation on a vertical axis, which engages the inboard surface of guide rail 72 to locate end cap 58 transversely relative to the rail 72.

In a similar manner, a bracket 61 secured to rear end cap 60 supports a pair of longitudinally spaced rollers 80 and 82 adapted to roll along the upper surface of rear guide rail 74. A tension spring 98 coupled between bracket 61 and the free end of an arm 94 pivotally received by end cap 60 urges a roller 90 carried by arm 94 upwardly against the lower surface of guide rail 74 to prevent vertical jitter. A roller 86 carried by bracket 61 for rotation on a vertical axis engages the inner surface of guide rail 74 to locate end cap 60 transversely relative to the rail 74.

Full-rate scanning carriage 28 is independently drive at its front and rear end by respective flexible members comprising smooth drive bands 100 and 102. Referring now also to FIGS. 2B and 3, pulleys 108 and 110 carried by respective shafts 116 and 118 located at the left and right ends of copier 10 support front drive band 100. In a similar manner, a pair of pulleys 112 and 114 respectively supported by the same shafts 116 and 118 carry rear drive band 102. Respective pairs of screws or the like 104 and 106 secure drive bands 100 and 102 at fixed locations along their lengths to respective brackets 59 and 61. As is apparent from the foregoing description, rotation of shaft 116 drives bands 100 and 102 at the front and rear of the copier 10. Bands 100 and 102 exert separate actuating forces on full-rate carriage 28 at its front and rear ends to minimize any twisting moments about its center of gravity.

Referring to FIG. 2B, to correct any relative misalignment of the ends of scanning carriage 28 with reference to the direction of scan, we secure respective upper and lower tabs 120 and 122 to the lower run of drive band 100. Respective upper and lower stops 128 and 130 carried by the copier frame at the front of the copier 10 intercept tabs 120 and 122 to arrest the front end of full-rate scanning carriage 28 as it reaches a predetermined position adjacent drive shaft 116.

Referring now to FIGS. 6 and 9, we secure respective upper and lower tabs 124 and 126 to the lower run of rear drive band 102. Respective stops 132 and 134 carried by the copier frame at the rear of the copier 10 intercept tabs 124 and 126 to arrest rear drive band 102, and thus the rear end of the full-rate scanner carriage 28, as that carriage end approaches the same predetermined point adjacent drive shaft 116. Preferably, each of the pairs of stops 128 and 130 and 132 and 134 carries a leaf spring 135, as shown for stops 132 and 134 in FIG. 9, to reduce the shock force generated on arresting the movement of the carriage 28.

Referring now to FIGS. 2B and 5, the half-rate carriage 36, which, like full-rate carriage 28, is generally bilaterally symmetrical, includes respective front and rear end caps 138 and 140 joined by a C-shaped bridge 136. End caps 138 and 140 carry the respective front and rear ends of half-rate mirrors 38 and 40. Preferably, the bridge 136 is perforated at regular intervals as shown in FIG. 5 to reduce its mass. Front end cap 138 rotatably supports a rotary member comprising a pulley 142 having a friction surface for rolling engagement with the upper surface of front guide rail 72. Respective idler pulleys 146 and 148 carried by end cap 138 to the left and right respectively of pulley 142, as viewed in FIG. 2B, direct drive band 100 around an arcuate upper portion of pulley 142. It will be apparent from the foregoing description that any longitudinal displacement of the drive band 100 produces a corresponding displacement, through half the distance, of the axis of pulley 142 and hence the front end of half-rate carriage 36.

Front end cap 138 also carries a bracket 139 to which is secured an upper guide roller 154, which rolls along the upper surface of guide rail 72 to the right of pulley 148, and an inboard guide roller 158 arranged on a vertical axis for rolling engagement with the inboard surface of guide rail 72. A pivot arm 166 supported by front end cap 138 carries a rotary member comprising a roller 162 adapted to bear against the lower surface of guide rail 72. A tension spring 170 extending between an outwardly projecting pin 174 carried by end cap 138 and the free end of arm 166 urges roller 162 into engagement with guide rail 72 to prevent vertical jitter of the front end of the carriage 36.

In a similar manner, the rear end cap 140 of half-rate scanning carriage 36 rotatably supports a rotary member comprising a pulley 144 having a friction surface for rolling engagement with the upper surface of rear guide rail 74. Respective idler pulleys 150 and 152 carried by end cap 140 to the left and right of pulley 144, as viewed from the front of the copier 10, direct drive band 102 about pulley 144. Longitudinal movement of drive band 102 through a predetermined displacement produces a corresponding movement, through half the distance, of the axis of pulley 144, and hence the rear end of half-rate scanner carriage 36.

A bracket 141 carried by rear end cap 140 rotatably supports an upper guide roller 156, adapted to roll along the upper surface of guide rail 74 to the right of pulley 152, as viewed from the front of the copier, and an inboard guide roller 160 mounted on a vertical axis for engagement with the inboard surface of guide rail 74. Roller 160 of rear end cap 140 and roller 158 of front end cap 138 cooperate to locate the scanner carriage 36 transversely relative to guide rails 72 and 74. Rear end cap 140 also supports a pivot arm 168 having a rotary member comprising a roller 164 mounted thereon. A tension spring 172 extending between the free end of pivot arm 168 and an outwardly projecting pin 176 carried by end cap 140 urges the roller 164 upwardly into engagement with the lower surface of guide rail 74. In a manner similar to that of lower guide roller 162 of front end cap 138, lower guide roller 164 prevents vertical jitter of the rear end of half-rate carriage 36 and the image distortion that would result therefrom.

Lower guide rollers 162 and 164 of end caps 138 and 140 carry respective toothed adjustment elements comprising segmented gears 218 and 220 for rotation therewith. A transversely extending shaft 222 couples guide rollers 162 and 164 for common rotation of the rollers and gears 218 and 220. Referring now also to FIG. 6, front and rear guide rails 72 and 74 carry respective toothed adjustment elements comprising gear teeth 224 and 226 at predetermined aligned location therealong. Teeth 224 and 226 engage the segmented gears 218 and 220 when the half-rate scanning carriage 36 moves from the right end of the copier 10 at the beginning of a given scanning cycle, before full-rate carriage 28 reaches a scanning position beneath platen 14. This arrangement automatically corrects any small misalignment of front end cap 138 relative to rear end cap 140, less than half the intertooth spacing of gears 218 and 220. If such a misalignment occurs, the forced coincident meshing of gears 218 and 220 with teeth 224 and 226 induces differential slippage between rollers 162 and 164 and guide rails 72 and 74, in an amount sufficient to correct the misalignment.

Referring now to FIGS. 2B and 8, a shaft 232 carried by front guide rail 72 receives a toothed adjustment element comprising a gear 230 for rotation inside a recess 234 formed in the outboard side of rail 72. Gear 230 is so positioned as to mesh with a toothed adjustment element comprising a gear 228 carried by half-rate pulley 142 as the half-rate carriage 36 moves past the right end of exposure platen 14. A spring 238 carried in a longitudinal recess 240 in guide rail 72 normally urges a brake 236 against a portion of gear 230 to restrain the gear against rotation. The forced meshing of the gear 228 with rotationally restrained gear 230 automatically eliminates any small misalignment of half-rate carriage 36 relative to full-rate carriage 28, less than half the intertooth gear spacing, which may occur because of slippage.

Referring to FIGS. 2B and 7, a separator member comprising a bell crank 198 is carried by a pivot 202 on the outboard side of front guide rail 72, to the left of gear 230 as viewed in FIG. 2B. Bell crank 198 has a generally horizontally extending upper arm formed with an upwardly opening notch 210 and a lower arm carrying a pin 194. A spring 206 biases the lower arm of bell crank 198 into engagement with one arm of a lower bell crank 186 carried by a pivot 190 mounted on the copier frame. The other arm of bell crank 186 is coupled to the armature 182 of a solenoid 178 also mounted on the copier frame. Referring now to FIG. 6, an upper bell crank or separate member 200 is carried by a pivot 204 on the outboard side of rear guide rail 74. Bell crank 200 has a generally horizontally extending upper arm formed with an upwardly opening notch 212 and a lower arm carrying a pin 196. A spring 208 biases the lower arm of bell crank 200 into engagement with one arm of a lower bell crank 188 carried by a pivot 192. The other arm of bell crank 188 is coupled to the armature 184 of a solenoid 180.

Normally, solenoids 178 and 180 remain unactuated, and bell cranks 198 and 200 are in the phantom-line position shown in FIGS. 2B and 6. To disengage half-rate scanner carriage 36 from guide rails 72 and 74, as is necessary when changing magnifications, drive bands 100 and 102 are first actuated so as to move pins 174 and 176 into register with notches 210 and 212. As is evident from FIG. 2B, at the "lift" position defined by pins 174 and 176 and notches 210 and 212, gear 228 meshes with gear 230, while gears 218 and 220 mesh with respective teeth 224 and 226. Solenoids 178 and 180 are then actuated to rotate bell cranks 186 and 188 counterclockwise about pivots 190 and 192. This causes upper bell cranks 198 and 200 to rotate clockwise about pivots 202 and 204 to the solid-line positions shown in FIGS. 2B and 6, so that notches 210 and 212 engage pins 174 and 176 to lift half-rate carriage 36 clear of the guide rails 72 and 74. By engaging pins 174 and 176, notches 210 and 212 also eliminate any misalignments that may have developed between the ends of the half-rate carriage 36. Since pulleys 142 and 144 are no longer constrained by engagement with guide rails 72 and 74, half-rate carriage 36 is effectively disengaged from drive bands 100 and 102, which may now be moved in a manner to be described to alter the relative displacement of carriages 28 and 36. Upon rotating clockwise, the lower arm of bell crank 198 also bears against a pin 242 carried by brake 236 to retract the brake 236 from gear 230 and thus free the gear for rotation. After full-rate carriage 28 has been shifted the desired distance from half-rate carriage 36, solenoids 178 and 180 are deactuated to recouple half-rate carriage 36 to drive bands 100 and 102 and immobilize gear 230.

Referring now to FIG. 2A, front and rear roller brackets 59 and 61 are formed with respective portions 214 and 216 at their right ends that slope upwardly and to the left as viewed in that figure. If, because of control-system failure or some other malfunction, full-rate carriage 28 moves too far to the right as viewed in FIG. 2A, bracket portions 214 and 216 intercept respective pins 174 and 176 of half-rate carriage 36, lifting the carriage 36 from the guide rails 72 and 74 in the manner described above. Full-rate carriage 28 then continues to urge half-rate carriage 36 to the right, at the same speed as the full-rate carriage, since the half-rate carriage is no longer constrained to move at half speed. Uncoupling half-rate carriage 36 from rails 72 and 74 in this manner prevents the damage that would occur if the carriage 36 remained coupled to the rails.

Referring now to FIG. 2B, we secure to the lower run of rear drive band 102 a tubular counterweight 247 slidable along a fixed coaxial guide rod 249. The mass of counterweight 247 is so selected that the center of mass of the scanning system 18 remains fixed as the carriages 28 and 36 move relative to platen 14, thereby minimizing the reaction forces imparted to the remainder of the copier 10 when the carriages are accelerated or decelerated.

Referring now to FIG. 3, the scanning system drive, indicated generally by the reference numeral 250, includes a prime mover comprising a servo-controlled DC scanner motor 252, which is used alone to drive the bands 100 and 102 during the variable-speed phases of the scanning cycle. These phases occur at the beginning and end of the forward scanning stroke of carriages 28 and 36, as well as on the return scanning stroke of the carriages. Scanner motor 252 is secured to the frame of the copier 10 by any suitable resilient mounting (not shown). A smooth friction gear 256 carried by the shaft 254 of motor 252 engages another smooth friction gear 258 carried by shaft 116. A tension spring 266 extending between the housing of motor 252 and the copier frame urges friction gear 256 into engagement with gear 258. The shaft 254 of scanner motor 252 also carries an optical encoder disk 260 formed, in a manner known in the art, with evenly spaced perforations (not shown) about its periphery. As the shaft 254 of motor 252 rotates, these perforations periodically allow a beam of light from a stationary source 262 to impinge upon a photodetector 264 to produce a train of pulses synchronous with the rotation of the motor 252.

The scanning system drive 250 also includes a flywheel motor 268, which is used to assist scanner motor 252 during the constant-velocity phase of the scanning cycle in which a document 16 on the platen 14 is scanned. In a manner similar to that of the scanner motor 252, the flywheel motor 268 is secured to the copier frame by a resilient mounting (not shown). The shaft 270 of motor 268 carries a friction gear 272 which engages a friction surface 274 of a rotating mass or flywheel 276, having a relatively high moment of inertia, which is rotatably received by shaft 116. A clutch 278 is intermittently actuated in a manner to be described to couple the flywheel 276, and hence the motor 268, to the shaft 116 during the constant-velocity phase of the scanning cycle.

Shaft 270 of the flywheel motor 268 carries a perforated optical encoder disk 280 which periodically interrupts a beam directed by a light source 282 upon a photodetector 284. Photodetector 284 thus produces a train of pulses synchronous with the rotation of shaft 270. Preferably a tension spring 286 extending between the housing of motor 268 and a frame portion of the copier urges friction gear 272 into engagement with the friction surface 274 of the flywheel 276.

As noted above, the flywheel 276, which is rotated at a constant speed during the entire scanning cycle, is only coupled to the pulley shaft 116, and hence the scanning carriages 28 and 36, during the constant-velocity phase of the scanning cycle in which a document 16 is scanned. This coupling of the scanning carriages 28 and 36 to the flywheel 276 serves to smooth out any momentary speed variations which may otherwise impair image quality. However, by uncoupling the flywheel 276 from the shaft 116 during the accelerative phases of the scanning cycle, we enable the scanner drive 250 to have a relatively high retrace rate, since the flywheel 276 does not contribute to the effective mass of the scanning elements 28 and 36 during these portions of the scanning cycle.

Referring again to FIG. 1, a separate motor 244 is used to drive the photoconductive drum 20. The shaft 22 of photoconductor drum 20 carries an optical encoder disk 246 formed with evenly spaced perforations (not shown) about its periphery. A sensor 248 directs a beam of light across the path of movement swept by the perforations of disk 246 to produce a train of pulses synchronous with the rotation of drum 20.

Referring now to FIG. 4, a flag 288 mounted on the bracket 61 of full-rate scanning carriage 28 interrupts a beam directed by a light source 292 upon a photodetector 294 whenever the carriage reaches a predetermined location along the scanning path. Photodetector 294 provides an absolute indication of the location of the full-rate carriage 28 along the scanning path. In a similar manner, referring now to FIG. 5, a flag 290 mounted on the rear bracket 141 of half-rate scanning carriage 36 interrupts a light beam between a source 296 and a photodetector 298 as the half-rate carriage reaches a predetermined location along the scanning path, such as the lift position defined by pins 174 and 176 and notches 210 and 212. Photodetector 298 is used to provide an absolute indication of the position of the half-rate carriage 36. Although only two sensors are shown in FIGS. 4 and 5, additional sensors may be used if desired to monitor the position of the carriages 28 and 36 at additional locations along the scanning path.

Figure 11:
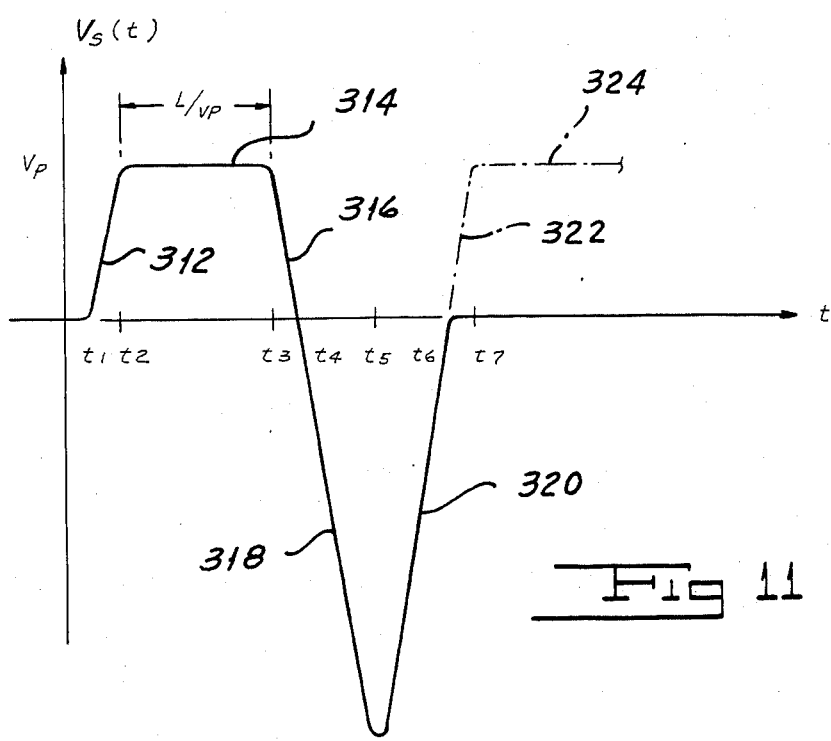
FIG. 11 is a plot of the scanner velocity as a function of time in the one-to-one magnification mode of the copier shown in FIG. 1.

Referring now to FIG. 11, we show the velocity Vs of the full-rate scanning carriage 28 during various phases of a scanning cycle for a 1:1 magnification ratio. At the beginning of the cycle, at time t1, the scanning carriage 28 is located at a "prescan" position toward the right end of the copier 10 as viewed in FIG. 1, with mirror 34 somewhat to the right of the initial scan position shown in solid lines in that figure. The scanning cycle starts with an acceleration phase 312, in which scanner motor 252 accelerates scanning carriage 28 at a uniform rate, preferably less than 2 g, to the desired scanning velocity, which in this case is the peripheral velocity Vp of the photoconductive drum 20.

At the end of the acceleration phase, at time t2, scanning carriage 28 reaches its "initial scan" position just below the right end of the exposure platen 14, as shown in solid lines in FIG. 1. During the constant-velocity phase 314 that follows, scanner motor 252 drives full-rate carriage 28 at the speed Vp of the photoconductor drum 20. Also during this phase, the flywheel 276 is coupled to the scanner carriage 28 to smooth out any fluctuations in its instantaneous velocity.

At time t3, the scanner carriage 28 reaches its "final scan" position, which is displaced from the initial scan position by the scanning length L, equal to the length of the latent image being formed on drum 20. At t3, the flywheel 276 is uncoupled from the carriage 28. Thereafter, during the deceleration phase 316 of the scanning cycle, scanning carriage 28 is decelerated at a uniform rate of deceleration, equal to the rate of initial acceleration but opposite in direction. The deceleration phase continues until a time t4 when the forward velocity of the scanning carriage 28 has been reduced to zero, and the carriage is at its leftmost position in the scanning cycle, shown in phantom lines in FIG. 1. For convenience, the position of the scanning carriage 28 at t4 will be referred to as the "postscan" position.

Rather than allowing scanning carriage 28 to dwell in its postscan position, scanner motor 252 immediately thereafter drives the carriage in the reverse direction, at the same uniform rate of acceleration, for the acceleration phase 318 of the return scanning stroke. At a time t5, when full-rate carriage 28 has reached a position midway between the prescan position at t1 and the postscan position at t4, accelerator motor 252 immediately begins to decelerate the scanning carriage at the same uniform rate so as to bring the carriage to rest at the end of the deceleration phase 320, at time t6, when the carriage 28 has returned to its prescan position.

If there are any copies remaining to be made, accelerator motor 252 immediately begins the acceleration phase 322 of the next scanning cycle, which is similar to the acceleration phase 312. At a time t7 when the acceleration phase 322 is complete and the full-rate carriage 28 again passes beneath the right end of the platen 14, the flywheel 276 is recoupled to the carriage to stabilize the speed of the scanning carriage during the next constant-velocity phase 324.

Referring now to FIG. 12, we show the velocity profile of the full-rate scanning carriage 28 for various scanning lengths L1, L2 and L3 at a 1:1 magnification ratio. It will be noted that the constant-velocity phases 314, 314' and 314" for the respective scanning lengths L1, L2 and L3 are proportional in duration to the selected length. In each instance the duration is the ratio of the selected scanning length to the velocity Vp of the drum surface 24 and full-rate carriage 28. The acceleration and deceleration phases 312, 316, 318, 320 and 322 are similar for different scanning lengths, the only difference being in the starting points of those phases other than the initial acceleration phase 312.

Referring now to FIG. 13, we show the velocity profile of the full-rate scanning carriage 28 for various selected magnification ratios. The principal difference between the profiles for the various magnifications is the velocity Vs of the full-rate carriage 28 during the constant-velocity phase of the scanning cycle, which is selected in inverse proportion to the magnification m to match the movement of the projected image to that of the drum surface 24. Thus, in a reduction mode where the magnification ratio is 0.5:1 (m=0.5), the scanning velocity Vs of the full-rate carriage 28 during the constant-velocity phase 314a for that ratio is twice the peripheral velocity Vp of the photoconductive drum 20. On the other hand, for a selected magnification ratio of 1.5:1 (m=1.5), the scanning velocity of the full-rate carriage 28 during the constant-velocity phase 314b for that ratio is ⅔ the peripheral velocity Vp of the drum 20. In general, this dependence of scanning velocity Vs on the selected magnification m is expressed by the equation $$V_s = V_p/m, \qquad (1)$$

where Vp is the peripheral velocity of the photoconductor 24.

The duration of the constant-velocity phase 314 of the scanning cycle may also vary with the selected magnification. Thus, if the scanning length L is held constant regardless of the selected magnification, the duration of the constant-velocity phase 314 will be directly proportional to the selected magnification ratio. On the other hand, if the copy length is held constant for different selected magnifications, the scanning length L will vary inversely with the selected magnification m, and the duration of the constant velocity phase will be the same for various selected magnifications. In general, for a copy length C and magnification m, the scanning length L is given by the equation $$L = C/m, \qquad (2)$$

while the duration (t3−t2) of the constant-velocity phase 314 of the scanning cycle is given by the equation $$t3 - t2 = C/V_p = mL/V_p \qquad (3)$$

It will also be apparent from FIG. 13 that the duration of the accelerative and decelerative phases of the scanning cycle varies with the selected magnification ratio m. Thus, if we assume a uniform rate A of acceleration or deceleration, the duration (t2−t1) of the accelerative phase 312 or the duration (t4−t3) of the decelerative phase 316 of the forward scanning stroke is given by the equation $$\begin{aligned} t2 - t1 = t4 - t3 &= V_s/A \\ &= V_p/mA. \end{aligned} \qquad (4)$$

During the accelerative phase 312 or decelerative phase 316, the full-rate carriage 28 travels through a distance $$x = V_s^2/2A = V_p^2/2m^2A. \qquad (5)$$

Accordingly, if the full-rate carriage 28 is to begin the constant-velocity phase 314 of the scanning cycle at an initial scan position just beneath the right end of the platen 14 as viewed in FIG. 1, the carriage 28 must start from a prescan position displaced to the right by at least the distance x given in equation (5) above, to allow sufficient distance for acceleration.

Preferably, to maximize the scanning rate, the rightward displacement of the prescan position from the right end of platen 14 is varied with the selected magnification m, in accordance with equation (5). Alternatively, a common prescan position, spaced a sufficient distance x from the platen end for the lowest selected magnification, may be used for all selected magnifications. In such an alternative arrangement, for selected magnifications greater than the lowest selected magnification, the full-rate carriage 28 will reach the proper scanning velocity before reaching a position aligned with the right end of the platen 14.

Although the movement of the half-rate scanning carriage 36 has not been specifically discussed in connection with FIGS. 11 to 13, it will be understood that the carriage 36 moves in a corresponding manner, but at half the speed of the full-rate carriage 28. As has been mentioned above, the displacement of the half-rate carriage 36 relative to the full-rate carriage 28 at a given point in the scanning cycle must be altered in accordance with the selected magnification m. In general, the object distance p between the lens 42 and the original document 16 and the image distance q between the lens and the imaging surface 24 are related by the equation $$1/p + 1/q = 1/f, \qquad (6)$$

where f is the focal length of the lens 42.

Since the image magnification m is given by the equation $$m = q/p \qquad (7)$$

we may solve for p and q in terms of m and f, and obtain $$p = (1 + 1/m)f, \qquad (8)$$

$$q = (m + 1)f, \qquad (9)$$

and $$p + q = (m + 1)^2 f/m. \qquad (10)$$

From these relations, it follows that for a given magnification ratio the lens 42 must be shifted from its position for one-to-one magnification by a distance $$d = (m - 1)f \qquad (11)$$

The lens 42 is shifted to the right as viewed in FIG. 1 for magnifications and to the left for reductions. Further, to obtain the proper total path length p+q for a given magnification, the half-rate carriage 36 must be shifted to the right, relative to full rate carriage 28, by a distance $$y = (m - 1)^2 f/2m \qquad (12)$$

Referring now to FIG. 10, the control circuit for the scanning system 18, indicated generally by the reference numeral 300, includes a programmed digital computer 302 of any suitable type known to the art. Computer 302 may comprise either a microcomputer having internal data and program memories (not separately shown), or a microprocessor, together with separate program and data memories. Computer 302 provides control signals to the various electromechanical devices of the copier 10 and scanning system 18, including the drum motor 244, the front lift solenoid 178, the rear lift solenoid 180, and the flywheel clutch 278. Computer 302 supplies digital outputs to a servo unit, indicated generally by the reference numeral 310, for controlling the flywheel motor 268 and the scanner motor 252. We provide computer 302 with inputs on lines from the various sensors of the copier 10 and scanning system 18, including a line 249 from the drum encoder 248, a line 285 from the flywheel encoder 284, a line 265 from the scanner encoder 264, and lines from the full-rate position sensor 294 and the half-rate position sensor 298. Computer 302 receives an input line 305 from an operator-actuated magnification selector 304, which provides a suitable digital signal indicating a selected magnification m between 0.50 and 1.56. Although some of the lines shown in FIG. 10, such as the line 305 from selector 304, are actually multiple-channel lines, they have been depicted as single-channel lines for convenience of exposition.

Figure 17:
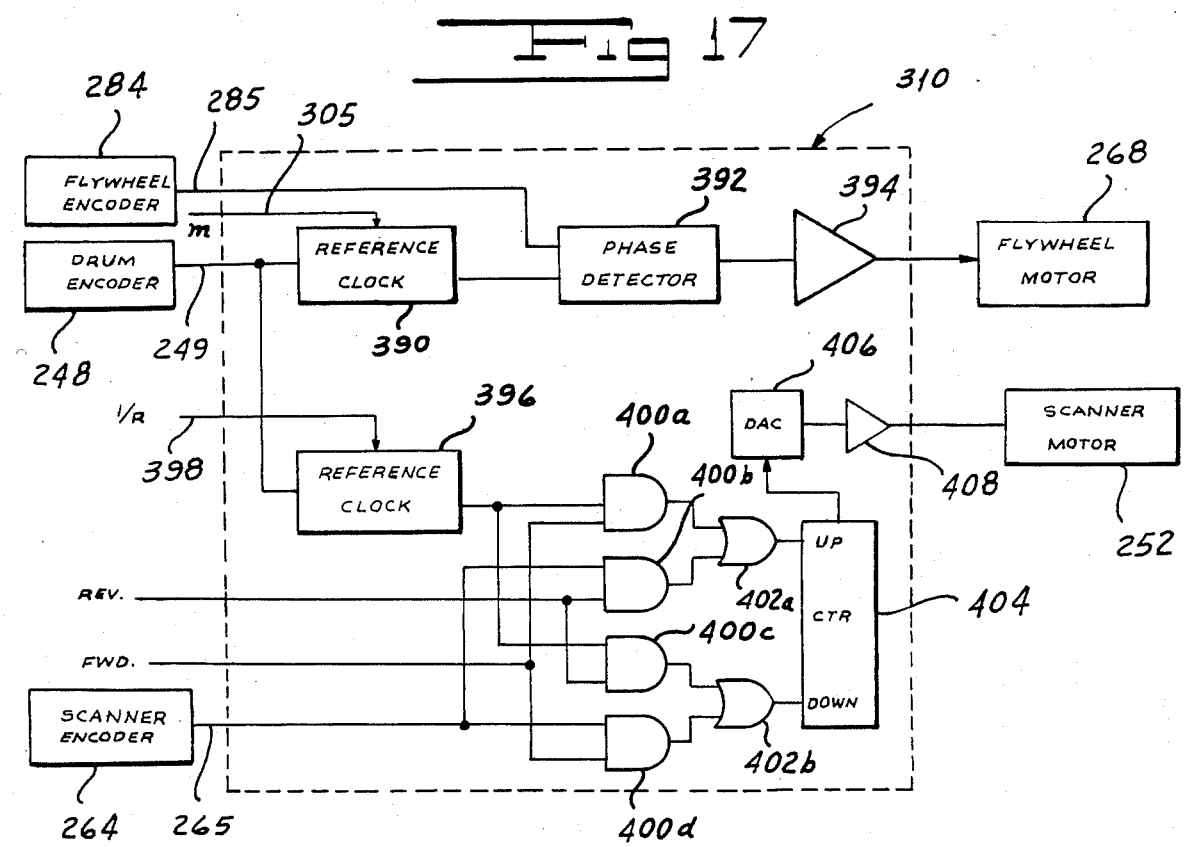
FIG. 17 is a schematic diagram of the servo control unit of the control circuit shown in FIG. 10.

Referring now to FIG. 17, the servo control 310 includes a reference clock 390 responsive to the pulse input supplied by drum encoder 248 on line 249, as well as to the signal on line 305 from selector 304 indicating the selected magnification m. In a manner known in the art, reference clock 390 provides a pulse output synchronous with the pulse input on line 249, at a relative frequency inversely proportional to the signal on line 305. Reference clock 390 may be constructed in any manner known in the art, such as shown in FIG. 10 of Cail et al U.S. Pat. No. 4,332,461. Reference clock 390 supplies its pulse output to one input of a phase detector 392, the other input of which is derived from the line 285 from flywheel encoder 284. In a manner known in the art, phase detector 392 supplies an output to a driver 394, coupled to flywheel motor 268, which is proportional to the phase difference between the input signals from reference clock 390 and flywheel encoder 284. By virtue of this arrangement, flywheel motor 268 is phase-locked to the drum motor 244 so as to rotate at a speed ratio, referred to the drum surface 24 and full-rate carriage 28, that is the reciprocal of the selected magnification m represented by the signal on line 305.

A second reference clock 396, similar to reference clock 390, receives a pulse input from the output line 249 of drum encoder 248 and a scale-factor input 1/R on a multiple-channel line 398 from the computer 302. The quantity R, the reciprocal of which appears on line 398, represents the ratio of the instantaneous desired scanning velocity, referred to the full-rate carriage 28, to the peripheral velocity of the photoconductive drum 20. Reference clock 396 provides an output pulse train that is synchronous with the input train on line 249, at a relative frequency proportional to the quantity R as indicated by the signal on line 398.

Reference clock 396 drives one input of a two-input AND gate 400a, as well as one input of a two-input AND gate 400c. The other inputs of AND gates 400a and 400c are derived respectively from a FWD line from computer 302, which carries a high logic signal during the forward scanning stroke, and from a REV line from computer 302 that carries a high logic signal during the reverse scanning stroke. AND gates 400a and 400c supply inputs to respective OR gates 402a and 402b coupled respectively to the up and down inputs of an up-down counter 404. OR gates 402a and 402b also receive inputs from respective AND gates 400b and 400d. AND gate 400b receives one input from scanner encoder 264 via line 265 and a second input from the REV line from computer 302. AND gate 400d receives inputs from the scanner encoder line 265 and from the FWD line from computer 302. Up-down counter 404 provides a multiple-channel digital output to a digital-to-analog converter (DAC) 406, which provides an analog output to a driver 408 coupled to the scanner motor 252.

Up-down counter 404, DAC 406, and the gates driving counter 404 perform a function similar to that of phase detector 392. During the forward scanning stroke, the FWD line carries a high logic signal, while the REV line carries a low logic signal. Accordingly, counter 404 counts up in response to the pulses from reference clock 396, indicating the target position of the scanning carriage 28, and counts down in response to the pulses from scanner encoder 264, indicating the actual position of the scanner 28. If the desired position of the scanning carriage 28 is more advanced than the actual position—that is, the left of the actual position as viewed in FIG. 1—DAC 406 supplies a positive error signal to driver 408, which supplies a corresponding correction signal to the scanner motor 252. Conversely, if the actual position of the scanning carriage 28 is more advanced than its desired position, DAC 406 provides a negative error signal to driver 408, which produces an appropriate correction signal.

During the reverse scanning stroke, the REV line carries a high logic signal, while the FWD line carries a low logic signal. Accordingly, counter 404 counts up in response to the actual position pulses on line 265 and counts down in response to the desired position pulses from reference clock 396. Owing to this reversal of counting mode, counter 404 provides a correction signal of the appropriate polarity to DAC 406 to control the motion of scanner motor 252 during the reverse scanning stroke.

By virtue of this arrangement, scanner motor 252 is phase-locked to the drum motor 244 in a manner similar to that of flywheel motor 268. In contrast to the flywheel motor 268, which rotates at a nominally constant velocity for a given magnification, scanner motor 252 rotates at a velocity Vs that is determined by the particular phase of the scanning cycle, as shown in FIGS. 11 to 13. In general, scanner motor 252 moves full-rate carriage 28 in a direction determined by the levels of the FWD and REV signals from computer 302, and at a target velocity Vs that is the product of the peripheral drum velocity Vp and the quantity R (the "ramp coefficient") represented by the signal on line 398. Thus, at the midpoint of the acceleration phase 312, the ramp coefficient R is $\frac{1}{2}$m, and the scanner motor 252 is driven at an instantaneous target velocity half that of the flywheel motor 268. On the other hand, during the nominally constant-velocity phase 314, when the ramp coefficient R is 1/m, the scanner motor 252 is driven at the same target velocity as the flywheel motor 268.

Referring now to FIG. 14, we show the sequence of operation followed by the computer 302 for readjusting the relative positions of the scanning carriages 28 and 36 at the beginning of operation or when changing magnification ratios. Referring now also to FIG. 10, upon entering the routine (step 330), the computer 302 first obtains the magnification ratio m selected by the operator using the selector 304 (step 332). The scanning length L may then be set automatically in accordance with equation (2) above. The digital signal from selector 304 representing the selected magnification m is also provided to the servo control 30 to adjust the flywheel motor 268 to the proper speed.

Referring now also to FIGS. 2B and 5 to 7, the computer 302 then provides an appropriate signal to the scanner motor 252 via servo control 310 to move the half-rate carriage 36 to the lift position adjacent the lifting arms of bell cranks 198 and 200 (step 334). Thereafter, the computer 302 actuates the lift solenoids 178 and 180 (step 336), rotating bell cranks 198 and 200 clockwise. Respective notches 210 and 212 of cranks 198 and 200 engage lifting pins 174 and 176 of half-rate carriage 36 to lift the carriage from guide rails 72 and 74, disengaging the half-rate carriage 36 from the drive bands 100 and 102. Referring now also to FIG. 8, clockwise rotation of bell crank 198 also urges pin 242 to the left as viewed in FIG. 2B, retracting brake 236 from gear 230 to allow the gear to rotate.

Thereafter (step 338) scanner motor 252 is actuated to move the full-rate carriage 28 relative to the half-rate carriage 36 so as to establish the proper spacing between the carriages for the selected magnification. For example, assuming that the carriages were previously adjusted for one-to-one magnification, the full-rate carriage 28 would be moved to the left by the distance y given in equation (12) above. After the relative spacing of the carriages 28 and 36 has been altered in this manner, the lift solenoids 178 and 180 are disabled, restraining gear 230 against further rotation and recoupling the half-rate carriage 36 to the drive bands 100 and 102 at a proper separation from full-rate carriage 28. Scanner motor 252 is then actuated so as to move full-rate carriage 28 to the proper prescan position as given by equation (5) above for the selected magnification (step 342), after which the computer 302 exits from the routine (step 344).

During the sequence shown in FIG. 14, the lens 42 is also moved axially to a proper spacing q from the drum surface 24 for the selected magnification ratio. Although the particular means for shifting the lens 42 along the path b forms no part of the present invention, a detailed description of the apparatus used to move the lens may be found in copending application of applicant Benzion Landa et al Ser. No. 628,233, filed July 6, 1984 entitled "Lens and Shutter Positioning Mechanism for Variable Magnification Copier."

Periodically, shaft 116 is driven so as to move the full-rate scanning carriage 28 to its left limit position to realign the carriage ends. FIG. 15 shows the routing followed by the computer 302 for accomplishing this realignment sequence. It will be assumed, for the sake of an example, that full-rate scanning carriage 28 has become misaligned so that the front end is somewhat to the left of its rear end as viewed in FIG. 2A. Referring now also to FIGS. 2B, 6 and 9, upon entering the routine (step 346) computer 302 drives motor 252 so as to advance the full-rate carriage 28 to a position adjacent to the left limit position defined by tabs 120 to 126 and stops 128 to 134 (step 348). At this point (step 350), the computer 302 energizes clutch 278 to couple the rotating flywheel 276 to the scanner drive train; this ensures a sufficient effective mass to cause slippage between bands 100 and 102 and drive pulleys 108 and 112. As motors 252 and 268 continue to advance the full-rate carriage 28 toward its left limit position, front limit stops 128 and 130 intercept front tabs 120 and 122 before the rear tabs 124 and 126 reach the rear stops 132 and 134. Front stops 128 and 130 then cause band 100 to slip relative to pulley 108 until rear stops 132 and 134 intercept rear taps 124 and 136. At this point, with both of the ends of full-rate carriage 28 in alignment, both of the bands 100 and 102 slip relative to pulleys 108 and 112 on shaft 116.

After the lapse of a sufficient period of time to permit such slippage to occur (step 352), clutch 278 is deenergized to uncouple the flywheel 276 from the scanner drive train (step 354), and motor 252 is actuated so as to return the full-rate scanner to the proper prescan position for the selected magnification (step 356). Although the bands 100 and 102 lose their original alignment with pulleys 108 and 112 as a result of this procedure, the arrival of the full-rate carriage 28 at the proper prescan position can readily be determined by detecting the return movement of full-rate carriage 28 past position sensor 294 and then counting the pulses produced by encoder 264 on line 265. Upon completion of the return step, the computer 302 exits from the realignment routine (step 358). This realignment routine may be entered either at predetermined periodic intervals or, if desired, in response to the detection of misalignment of the ends of the full-rate carriage 28.

Figure 16:
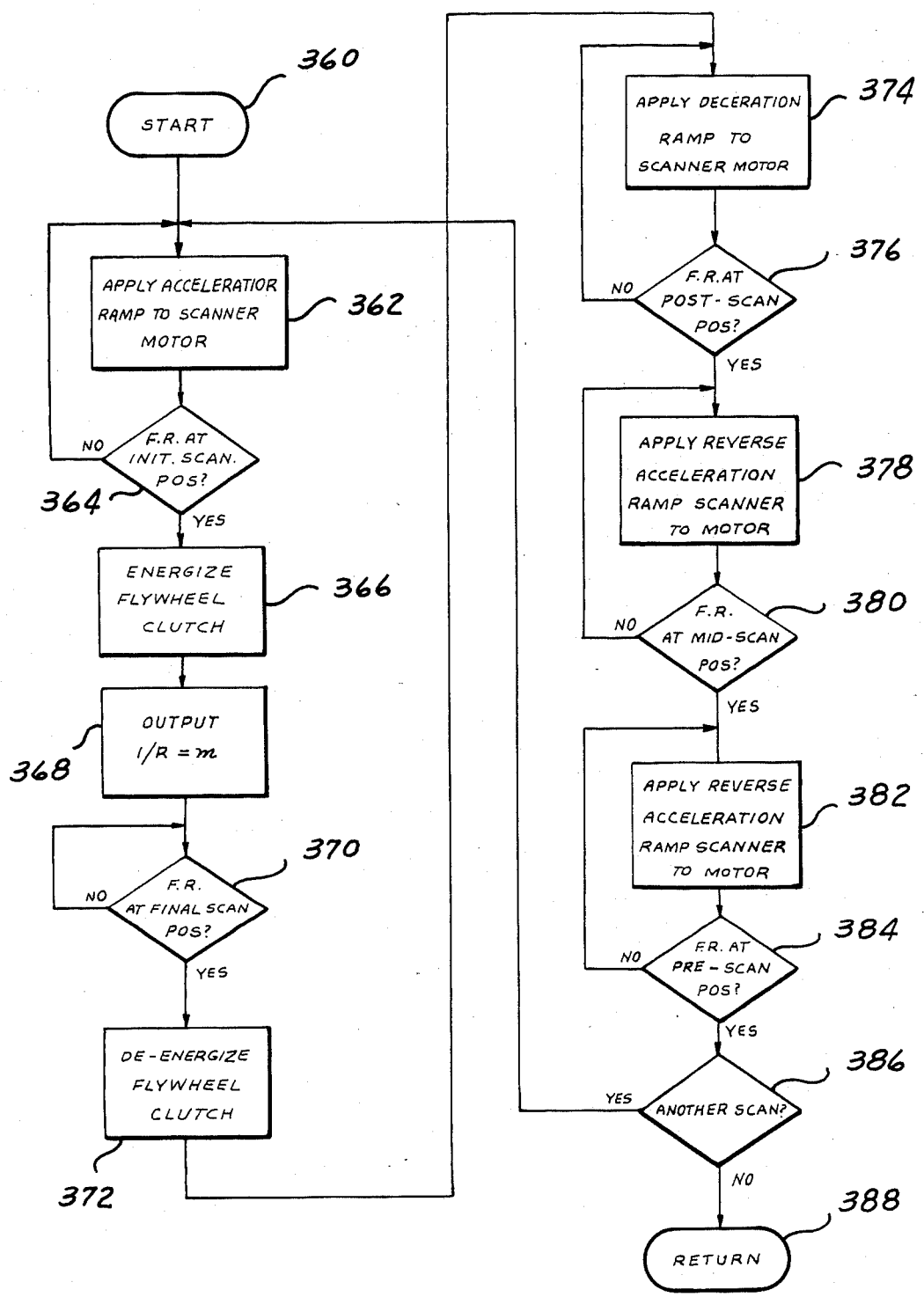
FIG. 16 is a flowchart of the routine followed by the control circuit shown in FIG. 10 to advance the scanning elements through one or more cycles of a scanning operation.

Referring now to FIG. 16, we show the routine followed by the computer 302 for controlling the movement of the scanning carriages 28 and 36 through one or more scanning cycles. Upon entering the routine (step 360), the computer applies an acceleration ramp to the scanner motor 252 to bring it to the proper scanning velocity for the selected magnification (step 362). This is achieved by supplying the servo control 310 with a high-level FWD signal and with a scale factor signal 1/R on line 398 that decreases gradually with the position of full-rate carriage 28. When, as determined by the encoder signal on line 265, the full-rate carriage 28 has reached the initial scan position (step 364), the computer 302 energizes the flywheel clutch 278 to couple the flywheel 276 to the scanning system drive train (step 366). Thereafter, the computer 302 supplies reference clock 396 with a scale-factor signal 1/R on line 398 equal to m, that is, with R equal to 1/m, so as to drive scanner motor 252 at the same speed as flywheel motor 268 during the constant-velocity phase 314 of the scanning cycle.

When, as determined by the encoder signal on line 265, the full-rate scanning carriage 28 reaches its final scan position (step 370), the computer 302 de-energizes the flywheel clutch 278 to uncouple the flywheel 276 from the scanning system drive train (step 372), and thereafter applies a deceleration ramp on line 398 to the servo unit 310 to decelerate scanner motor 252, and hence the scanning carriages 28 and 36, at a uniform rate of deceleration (step 374). When the full-rate carriage 28 reaches its post-scan position, as determined by the encoder signal on line 265 (step 376), computer 302 terminates the high-level signal FWD, and immediately thereafter supplies a high-level REV signal and applies a reverse acceleration ramp to servo unit 310 by way of line 398 to accelerate the scanning elements during the first portion of the return scanning stroke (step 378). When the full-rate carriage 28 is sensed to have reached its mid-scan position halfway between the prescan and postscan positions (step 380), the computer 302 applies a reverse deceleration ramp to scanner motor 252 to bring the scanning carriages 28 and 36 to a rest as they return to their prescan positions (step 382). When the full-rate scanning carriage 28 is sensed to have returned to its prescan position (step 384), the computer 302 terminates the REV signal and either exits from the routine (step 388) or, if another scan is to be performed (step 386), returns to the beginning of the routine.

It is possible to employ a flywheel clutch 278 that, rather than being electrically actuated, consists simply of a one-way clutch that permits the flywheel 276 to overrun the drive shaft 116. In such a case, scanner motor 252 would be controlled by computer 302 so as to accelerate full-rate carriage 28 to a target velocity Vs during the constant-velocity phase that is slightly in excess of the velocity Vp/m of the mass 276. Coupling of the mass 276 to the drive shaft 116 would occur automatically at the end of the acceleration phase 312, when the actual velocity of the full-rate carriage 28 reached that of the flywheel 276. The relative torques of the scanner motor 252 and flywheel motor 268 would be so selected that the flywheel motor 268 would overpower the scanner motor 252 during the constant-velocity phase 314 to hold its velocity to Vp/m. Uncoupling of the flywheel 276 from the drive shaft 116 would occur automatically at the beginning of the deceleration phase 316 as the target velocity Vs of scanner motor dropped below the velocity Vp/m of the flywheel 276.

Figure 18:
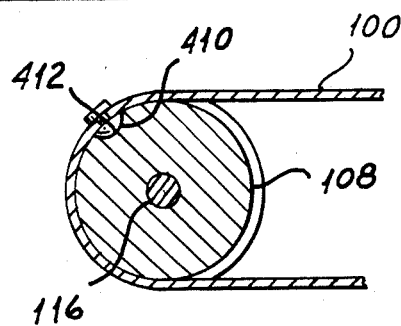
FIG. 18 is a fragmentary section of an alternative form of construction of the drive bands and pulleys of the scanning system shown in FIGS. 1 to 9.

Referring now to FIG. 18, we show an alternative system for correcting misalignments between the ends of full-rate scanner 28. More particularly, in the alternative form of construction shown in FIG. 18, each of the drive bands 100 and 102 is provided with a rivet 410 having a head or projection mating with a recess 412 formed in the corresponding drive pulley 108 or 112. If, because of slippage, either of the bands 100 or 102 becomes misaligned in the direction of drive relative to the corresponding pulley 108 or 112, the head of rivet 410 will bear against the recess 412 so as to correct the misalignment. Preferably, rivets 412 are so placed along the length of bands 100 and 102 that they enter recesses 412 during the prescan phase 312 of the scanning cycle.

Figure 19:
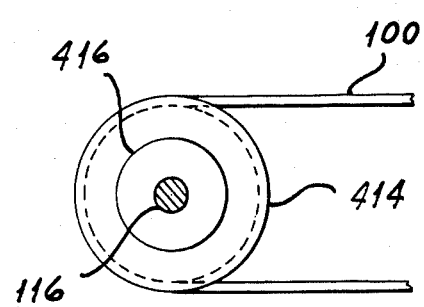
FIG. 19 is a fragmentary front elevation, with parts shown in section, of another alternative form of construction of the drive pulleys of the scanning system shown in FIGS. 1 to 9.

Referring now to FIG. 19, we show a modified form of construction in which each of the drive pulleys 108 and 110 is replaced by a pulley 414 coupled to the drive shaft 116 by a friction clutch 416. Such a modified scanning system containing drive pulleys 414 operates generally in the manner described above, except that the slippage induced by driving tabs 120 to 126 against stops 128 to 134 occurs between the friction surfaces of the clutches 416 rather than between the bands 100 and 102 and the drive pulleys 108 and 110. Friction clutches 416 may be especially desirable where a one-way clutch instead of an electrically actuated clutch is used for the flywheel clutch 278 since, in such an alternative form of construction, the flywheel 276 supplies only retarding torques to the scanner drive train and the forward torque available from motor 252 for inducing slippage is rather limited.

Figure 20:
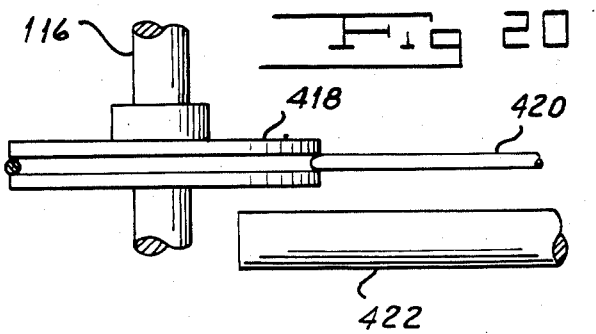
FIG. 20 is a fragmentary top plan, with parts shown in section, of another alternative form of construction of the scanning system shown in FIGS. 1 and 9, employing cylindrical guide rails and drive cables.

Although in the preferred form of our invention, shown in FIGS. 1 to 9, guide rails of rectangular cross-section and drive bands are employed, other elements could also be used. Thus, FIG. 20 shows an alternative form of construction in which smooth drive cables 420, supported by pulleys 418, replace drive bands 100 and 102, while cylindrical guide rails 422 replace guide rails 72 and 74.

It will be seen that we have accomplished the objects of our invention. Our scanning system is especially suitable for use in a variable-magnification electrophotographic copier. Our system is capable of high-speed operation, yet scans a document at a uniform velocity, without jitter or speed fluctuations. Our scanning system maintains the various scanning elements in synchronism with one another and with the photoconductor. Finally, our scanning system maintains the ends of the scanning carriages in registration with each other.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. An optical scanning system including in combination a first scanning element, means mounting said first element for movement along a scanning path, a second scanning element, a pulley, means mounting said pulley on said second element for rotation relative thereto, means providing a surface for receiving said pulley to support said second scanning element for movement along said path, an elongated flexible member coupled to said first element, means for constraining a portion of the length of said flexible member into engagement with the periphery of said pulley, and means for tensioning said flexible member to move said elements along said path.

2. Apparatus as in claim 1 including means for disengaging said pulley from one of said surface and said flexible member.

3. Apparatus as in claim 1 including means for disengaging said pulley from said surface.

4. Apparatus as in claim 1 including a separator member disposed along said path and means for moving said separator member into engagement with said second scanning element to separate said pulley from said surface.

5. Apparatus as in claim 1 in which said pulley has smooth friction surface portions for engaging said surface and said flexible member.

6. Apparatus as in claim 1 including a first toothed element rotatably secured to said second scanning element and a second toothed element disposed at a fixed location along the path of movement of said second scanning element for engaging said first toothed element.

7. Apparatus as in claim 1 including a first toothed element carried by said pulley and a second toothed element disposed at a fixed location adjacent said surface for engaging said first toothed element.

8. Apparatus as in claim 1 including a first gear carried by said pulley, a second gear disposed at a fixed location adjacent said surface for engaging said first gear, and selectively operable means for restraining said second gear against rotation.

9. Apparatus as in claim 1 including a first gear carried by said pulley, a second gear disposed at a fixed location adjacent said surface for engaging said first gear, means for restraining said second gear against rotation, means at said location for separating said pulley from said guide surface, and means operable concurrently with the separation of said pulley from said surface for disabling said restraining means.

10. Apparatus as in claim 1 including means for disengaging said second element from said flexible member to change the spacing between said first and second elements.

11. Apparatus as in claim 1 including means carried by said first element for engaging said second element to separate said second element from said surface.

12. An optical scanning system including in combination a scanning element mounted for movement along a path, means for accelerating said element to a desired speed, a flywheel, means for driving said flywheel at a predetermined speed, and means operable only following the acceleration of said element to said desired speed for coupling said element to said flywheel.

13. Apparatus as in claim 12 further comprising means for decelerating said scanning element from said desired speed and means operable prior to the deceleration of said scanning element from said desired speed for uncoupling said element from said flywheel.

14. Apparatus as in claim 12 in which said accelerating means includes means for controlling the acceleration of said element to said predetermined speed.

15. Apparatus as in claim 12 in which said accelerating means includes means for limiting the acceleration of said element to a predetermined acceleration.

16. Apparatus as in claim 12 in which said coupling means comprises an electrically actuated clutch.

17. Apparatus as in claim 12 in which said coupling means comprises a one-way clutch.

18. Apparatus as in claim 12 in which said coupling means comprises a one-way clutch permitting overrunning movement of said flywheel, said accelerating means comprising means for accelerating said element to a desired speed greater than said predetermined speed.

19. An optical scanning system for a variable-magnification copier including in combination a scanning element mounted for movement along a path, a mass, means for selecting a magnification ratio, means for driving said mass at a speed corresponding to said selected magnification ratio, and means for intermittently coupling said element to said mass.

20. Apparatus as in claim 19 in which said mass comprises a flywheel.

21. In an electrophotographic copier having a photoconductor, means for supporting an original, and means for forming an image of said original on said photoconductor, the improvement wherein said image-forming means comprises a scanning element mounted for movement along a path, a flywheel mounted for movement independently of said photoconductor, means for driving said flywheel at a predetermined speed, and means for intermittently coupling said flywheel to said scanning element.

22. Apparatus as in claim 21 in which said scanning element is mounted for reciprocating movement, said coupling means being operable only during the movement of said scanning element in one direction along said path.

23. Apparatus as in claim 22 including means for synchronizing the movement of said flywheel with the movement of said photoconductor.

24. An optical scanning system including in combination a scanning element mounted for movement along a path, said scanning element having portions transversely spaced with reference to said path, a prime mover, means for providing separate friction couplings between said prime mover and said portions to move said element along said path, and means for intercepting said portions at predetermined aligned locations along said path.

25. Apparatus as in claim 24 including a mass and means for intermittently coupling said mass to said prime mover.

26. An optical scanning system including in combination a scanning element mounted for movement along a path, said element having portions transversely spaced with reference to said path, means for exerting separate actuating forces on said portions to move said element, a first pair of adjustment elements respectively carried by said portions, and a second pair of adjustment elements respectively adapted to engage said first pair of adjustment elements at predetermined locations along said path to realign said portions of said scanning element.

27. Apparatus as in claim 26 in which said adjustment elements are toothed elements.

28. Apparatus as in claim 26 in which said first pair of adjustment elements are rotary elements.

29. Apparatus as in claim 26 in which said first pair of adjustment elements are rotary elements coupled to each other for common rotation.

30. Apparatus as in claim 26 including respective rotary members supporting said first pair of adjustment elements and respective guides for receiving said rotary members for movement therealong.

31. An optical scanning system including in combination a scanning element mounted for movement along a path, means for moving said scanning element along said path, a first adjustment element carried by said scanning element, and a second adjustment element disposed at a predetermined location along said path, one of said adjustment elements being formed with a recess, the other of said adjusment elements being formed with a projection adapted to mate with said recess to adjust the position of said scanning element.

32. Apparatus as in claim 31 in which said adjustment elements are toothed elements.

33. Apparatus as in claim 31 in which said first adjustment element is a rotary element.

34. Apparatus as in claim 31 including a rotary member supporting said first adjustment element and a guide for receiving said rotary member for movement therealong.

35. Apparatus as in claim 21 in which said second adjustment element is a rotary element, said apparatus including selectively operable means for restraining said rotary element against rotation.

36. Apparatus as in claim 31 in which said adjustment elements comprise respective first and second gears.

* * * * *